(12) United States Patent
Koike et al.

(10) Patent No.: US 8,842,365 B2
(45) Date of Patent: Sep. 23, 2014

(54) PHASE DIFFERENCE ELEMENT AND METHOD FOR MANUFACTURING THE SAME

(75) Inventors: Nobuyuki Koike, Miyagi (JP); Masatoshi Sasaki, Miyagi (JP); Naoki Hanashima, Miyagi (JP); Akio Takada, Miyagi (JP); Takatoshi Yamada, Miyagi (JP)

(73) Assignee: Dexerials Corporation, Tokyo (JP)

( * ) Notice: Subject to any disclaimer, the term of this patent is extended or adjusted under 35 U.S.C. 154(b) by 241 days.

(21) Appl. No.: 13/473,100

(22) Filed: May 16, 2012

(65) Prior Publication Data

US 2012/0293732 A1    Nov. 22, 2012

(30) Foreign Application Priority Data

May 16, 2011   (JP) .................. 2011-109688

(51) Int. Cl.
  *G02B 1/10*   (2006.01)
  *G02B 1/11*   (2006.01)
(52) U.S. Cl.
  CPC ...................... *G02B 1/115* (2013.01)
  USPC ........................................................ 359/587
(58) Field of Classification Search
  CPC .......... G02B 1/11; G02B 1/111; G02B 1/113; G02B 1/115; G02B 1/116; G02B 1/118; G02B 5/08; G02B 5/285
  USPC ................... 359/584–587, 601, 883
  See application file for complete search history.

(56) References Cited

U.S. PATENT DOCUMENTS

2011/0242662 A1* 10/2011 Momoki et al. ............... 359/586
2012/0275027 A1* 11/2012 Okuno ........................... 359/601

* cited by examiner

*Primary Examiner* — Euncha Cherry
(74) *Attorney, Agent, or Firm* — Osha Liang LLP

(57) ABSTRACT

A phase difference element capable of reducing reflection of incident light and a manufacturing method for the phase difference element are disclosed. The phase difference element includes a transparent substrate 11, an interface anti-reflection film group 12 and an obliquely vapor deposited film 13. The interface anti-reflection film group is composed by one or more of alternately high and low refractive index films, with the film thicknesses of the respectively films being equal to or less than the wavelength of light in use. The obliquely vapor deposited film is formed by a plurality of layers of a dielectric material. These layers are alternately obliquely vapor deposited from two directions differing by 180° from each other. The refractive index of the interface anti-reflection film group 12 is higher than the refractive index of the transparent substrate 11 and lesser than that of the obliquely vapor deposited film 13.

13 Claims, 31 Drawing Sheets

PHASE DIFFERENCE ELEMENT AND METHOD FOR MANUFACTURING THE SAME

BACKGROUND OF THE INVENTION

1. Field of the Invention

This invention relates to a phase difference element typified by a half or quarter wave plate. More particularly, it relates to a phase difference element exploiting the difference in the refraction index in the planer axial direction in a light bandwidth in use, and a method for manufacturing the same.

2. Description of Related Art

Conventionally, the phase difference element is manufactured from an inorganic optical single crystal, such as quartz, or from a stretched high molecular film. The inorganic optical single crystal, while being satisfactory in performance, durability and reliability as phase difference element, suffers the problem that the cost of raw materials and the processing cost are high and that the optical characteristic of the phase difference element exhibits marked incident angle dependency. The stretched high molecular film, a most popular phase difference element in current use, has a drawback that it may readily be deteriorated against heat or UV light rays and hence is problematical in durability.

On the other hand, there is known, as such phase difference element, an obliquely vapor deposited film having an oblique or inclined columnar structure (obliquely vapor deposited phase difference element). See for example Patent Publications 1 to 3 and Non-Patent Publication 1. As a principle, it is possible with this obliquely vapor deposited film to set a desired phase difference value by adjusting the film thickness and to increase its surface area with relative ease as well as to reduce the cost by volume production. In addition, since the phase difference element is formed of an inorganic material, it is highly resistive against light and heat.

RELATED TECHNICAL PUBLICATIONS

Patent Publications

[Patent Publication 1] Japanese Laid-Open Patent 2001-228330
[Patent Publication 2] Japanese Laid-Open Patent 2006-171328
[Patent Publication 3] Japanese Laid-Open Patent S63-133203

Non-Patent Publication

[Non-Patent Publication 1] Serial bideposition of anisotropic thin films with enhanced linear birefringence/APPLIED OPTICS/Vol. 38 No. 16/1 Jun. 1999

SUMMARY OF THE INVENTION

Problems to be Solved by the Invention

The phase difference element, exploiting an obliquely vapor deposited film, is highly resistive against light and heat. However, since a high refraction index substance, such as $Ta_2O_5$, $ZrO_2$ or $TiO_2$, is used as the material for vapor deposition, there is produced a marked differential between the refraction index of the phase difference element and that of glass or quartz as a main component material of a transparent substrate. As a result, reflection of incident light occurs on a substrate/vapor deposited film interface.

In view of the above mentioned status of the art, it is an object of the present invention to provide a phase difference element capable of reducing reflection of incident light, and a manufacturing method thereof.

Means to Solve the Problem

To accomplish the above object, a phase difference element according to the present invention includes a transparent substrate, and an obliquely vapor deposited multi-layer film formed by a plurality of layers of a dielectric material. The layers of the dielectric material are alternately vapor deposited from two directions differing by 180° from each other, with the thicknesses of the respective layers being not greater than the wavelength of light in use. The phase difference element also includes an interface anti-reflection film group composed by one or more of alternately high and low refractive index films stacked between the transparent substrate and the obliquely vapor deposited film. The refractive index of the interface anti-reflection film group is higher than the refractive index of the transparent substrate and lower than that of the obliquely vapor deposited film.

A method for manufacturing a phase difference element according to the present invention includes alternately depositing one or more of high and low refractive index films on a transparent substrate to form an interface anti-reflection film group. The refractive index of the interface anti-reflection film group is higher than the refractive index of the transparent substrate and lower than that of the obliquely vapor deposited film. The method also includes alternately obliquely depositing a dielectric material on the interface anti-reflection film group from two directions differing 180° from each other to form a multi-layered obliquely vapor deposited film. The thicknesses of component layers of the multi-layered obliquely vapor deposited film are not greater than the wavelength of light in use.

A liquid crystal projector according to the present invention includes a phase difference element arranged between a polarization beam splitter and a liquid crystal cell. The phase difference element includes a transparent substrate, and an obliquely vapor deposited multi-layer film formed by a plurality of layers of a dielectric material. The layers of the dielectric material are alternately vapor deposited from two directions differing by 180° from each other. The thicknesses of the respective layers are not greater than the wavelength of light in use. The phase difference element also includes an interface anti-reflection film group composed by one or more of alternately high and low refractive index films stacked between the transparent substrate and the obliquely vapor deposited film. The refractive index of the interface anti-reflection film group is higher than the refractive index of the transparent substrate and lower than the refractive index of the obliquely vapor deposited film.

An optical implement according to the present invention has mounted thereon a phase difference element including a transparent substrate and an obliquely vapor deposited multi-layer film formed by a plurality of layers of a dielectric material. The layers of the dielectric material are alternately vapor deposited from two directions differing by 180° from each other. The thicknesses of the respective layers are not greater than the wavelength of light in use. The phase difference element also includes an interface anti-reflection film group composed by one or more of alternately high and low refractive index films stacked between the transparent substrate and the obliquely vapor deposited film. The refractive index of the interface anti-reflection film group is higher than the refractive index of the transparent substrate and lower than the refractive index of the obliquely vapor deposited film.

Effect of the Invention

The phase difference element according to the present invention includes the interface anti-reflection film group composed by one or more of alternately high and low refractive index films. The refractive index of the interface anti-reflection film group is higher than the refractive index of the transparent substrate and lower than that of the obliquely vapor deposited film. It is thus possible to reduce reflection of incident light and to improve the optical characteristic.

BEST MODE FOR CARRYING OUT THE INVENTION

Figure 1:
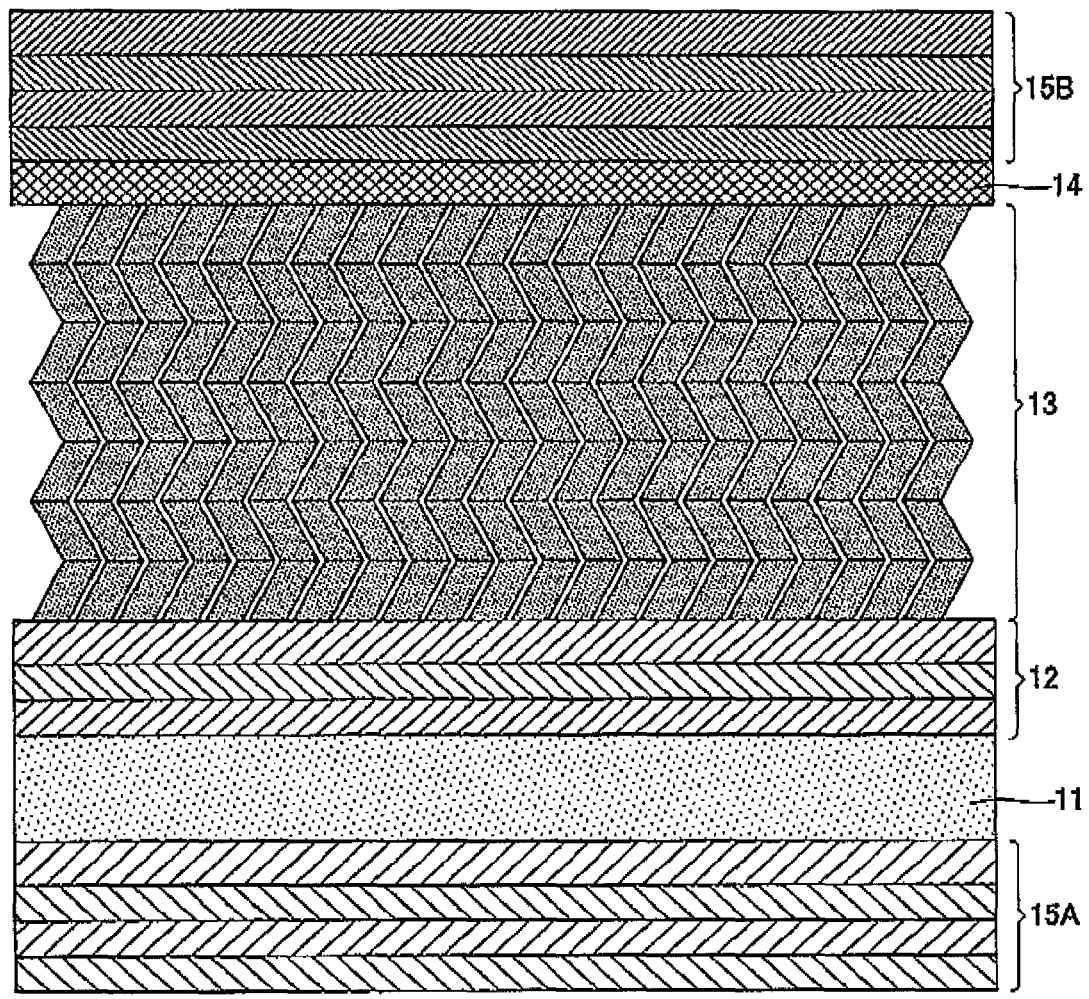
FIG. 1 is a schematic cross-sectional view showing a phase difference element according to an embodiment of the present invention.

The best mode for carrying out the present invention will now be described in detail with reference to the drawings.
1. Configuration of phase difference element
2. Manufacturing method for the phase difference element
3. Example application to a liquid crystal projector
4. Example 1. Configuration of Phase Difference Element FIG. 1 depicts a cross-sectional view schematically showing a phase difference element according to an embodiment of the present invention. Referring to FIG. 1, a phase difference element 1 includes a transparent substrate 11, an interface anti-reflection film group 12, an obliquely vapor deposited film 13 and a dielectric film 14. The interface reflection inhibit film group 12 is composed of one or more of alternately high and low refractive index films, deposited on the transparent substrate 11, with the thicknesses of the respective films being less than the light wavelength in use. The obliquely vapor deposited film 13 is composed of a plurality of dielectric layers obliquely deposited on the interface reflection inhibit film group 12 from two directions alternately differing 180° from each other. The dielectric film 14 is deposited by CVD (Chemical Vapor Deposition) on the obliquely vapor deposited film 13. On the front and reverse surfaces of the resulting composite film, there are provided anti-reflection film groups 15A, 15B which are composed by dielectric layers.

The transparent substrate 11 is formed of a material, with a refractive index of 1.1 to 2.2, transparent to a light bandwidth in use, such as glass, quartz or crystal. Since quartz has a high thermal resistance and an extremely low thermal expansion coefficient as well as an extremely high light transmission factor for the total wavelength range of from ultraviolet to infrared, it is preferentially used in particular for a phase difference element of a reflection liquid crystal projector.

The interface anti-reflection film group 12 is provided between the transparent substrate 11 and the obliquely vapor deposited film 13, and is composed by a plurality of films of alternately high and low refractive index materials. The interface anti-reflection film group 12 operates as a matching film that diminishes reflection of incident light between it and the transparent substrate 11 as well as the obliquely vapor deposited film 13. If the interface anti-reflection film is formed of a single layer material, it is difficult for the interface anti-reflection film to satisfy the demand for surface properties of a base material and for the refractive index that will exhibit anti-reflection effects. In the present embodiment, the reflective index is diminished by the interface anti-reflection film group 12 composed by two or more alternately high and low refractive index films.

In the interface anti-reflection film group 12, the film in contact with the obliquely vapor deposited film 13 is preferably $SiO_2$. By forming the uppermost film of the interface anti-reflection film group 12 from $SiO_2$ which is the same material as that of the transparent substrate, the optical characteristic of the obliquely vapor deposited film 13 may be suppressed from variations. The film thickness of $SiO_2$ is preferably 60 nm or more. With the film thickness of $SiO_2$ of 60 nm or more, it is possible to obtain the obliquely vapor deposited film 13 having a satisfactory optical characteristic. In the obliquely vapor deposited film 13, the optical characteristic, such as birefringence, appreciably depends on a surface of the base material on which the obliquely vapor deposited film 13 is deposited. Thus, insofar as an obliquely vapor deposited film-substrate interface is concerned, it is necessary to take into account the desirable effect proper to the obliquely vapor deposited film in designing an anti-reflection film in general.

The refractive index of the interface anti-reflection film group 12 is higher than that of the transparent substrate 11, while being lower than that of the obliquely vapor deposited film 13. This enables reflection of incident light to be decreased.

In more concrete terms, the average refractive index n of the interface anti-reflection film group 12 is preferably expressed by the following relationship:

$$n_{sub} < n < (n_{oblx} + n_{obly})/2 \quad (1)$$

in which $n_{sub}$ denotes a refractive index of the transparent substrate 11 and $n_{oblx}$, $n_{obly}$, where $n_{oblx} > n_{obly}$, denote refractive indices of two axes x, y in the plane of the obliquely vapor deposited film 13, perpendicular to each other, respectively.

The refractive index of the interface anti-reflection film group 12 is determined in dependence upon the wavelength range for which the phase difference element is used. For example, if with the reference wavelength of 550 nm, the refractive index of the glass substrate is 1.51 and that of the obliquely vapor deposited film 13 is ca. 1.63, it is sufficient that the interface anti-reflection film group 12 is formed of a dielectric material whose refractive index is intermediate between the two values, for example, 1.53 or thereabouts.

The interface anti-reflection film group 12 is preferably of a three-layer structure composed by a low refractivity index film, a high refractivity index film and a low refractivity index film, deposited in this order. Preferably, the refractivity index $n_L$, of the low refractive index material is lower than 1.5, while the refractivity index $n_H$ of the high refractive index material is higher than 2.0. For the high refractivity index film, high refractivity index materials, such as $Nb_2O_5$, $TiO_2$, $LaTiO_3$ or $Ta_2O_5$, may be used.

When the refractive indices $n_{oblx}$, $n_{obly}$, where $n_{oblx} > n_{obly}$, of two axes x, y in the plane of the obliquely vapor deposited film, perpendicular to each other, are in a range from not less than 1.55 to not more than 1.7, the film thickness of the high refractive index film, out of the three films of the three-layer film structure, is in a range from not less than 0.1 nm to not more than 5.5 nm. This may give a reflectance not higher than 0.3% for the blue wavelength range of 440 to 510 nm.

Preferably, the film thickness of the interface anti-reflection film group of the three-layer film structure is not more than 90% of the design center wavelength. With the film thickness of the interface anti-reflection film being not more than 90% of the design center wavelength, it is possible to reduce the reflectance.

In forming the obliquely vapor deposited film 13, a dielectric material is alternately vapor deposited from two directions different 180° from each other. In known manner, oblique vapor deposition gives rise to intra-film non-uniformity (difference in the refractive index at the beginning stage of film forming and that at the final stage of film forming). In the phase difference element provided with the layered structure of the obliquely vapor deposited film 13, the reflectance between the layers of each neighbored layer pair is increased by this difference in the refractive indices. On the other hand, the difference in the refractive indices is proportionate to the film thickness of each layer. Thus, in the present embodiment, the thickness of each layer is set so as to be less than the wavelength of light in use to diminish the difference in the in-layer refraction indices to reduce reflection between the layers of each neighbored layer pair. In addition, by setting the thickness of each layer so as to be less than the wavelength of light in use, it becomes possible to improve the viewing angle dependency. Thus, in case the phase difference element is applied to, for example, a reflection liquid crystal projector, it becomes possible to improve the contrast of a projected image as well as to reduce color fluctuations or chromaticity biases.

The dielectric materials for the obliquely vapor deposited film 13 are preferably oxides of Ta, Zr, Ti, Si, Al, Nb or La, either alone or in combination. Examples of preferred dielectric materials include $Ta_2O_5$, $ZrO_2$, $TiO_2$ and $Ta_2O_5$ admixed with 5 to 15 wt % of $TiO_2$, With the use of these dielectric materials, it is possible to obtain the obliquely vapor deposited film in which the refractive indices $n_{oblx} > n_{obly}$, where $n_{oblx} > n_{obly}$, of two axes x, y in the plane of the obliquely vapor deposited film, perpendicular to each other, are not less than 1.55 and not more than 1.7.

The dielectric film 14 is a film of high denseness and may be obtained by film forming with the use of the CVD method. With the use of the dielectric film 14, it is possible to prevent the moisture in atmosphere from intruding into or exiting from the obliquely vapor deposited film 13.

The anti-reflection film groups (AR film groups) 15A, 15B may, for example, be multi-layered thin films composed by high and low refractive index materials and prevent surface reflection while improving light transmission performance.

With the phase difference element of the above described configuration, it is possible to reduce reflection of incident light and to improve viewing angle dependency.

2. Manufacturing Method for Phase Difference Element

Figure 2:
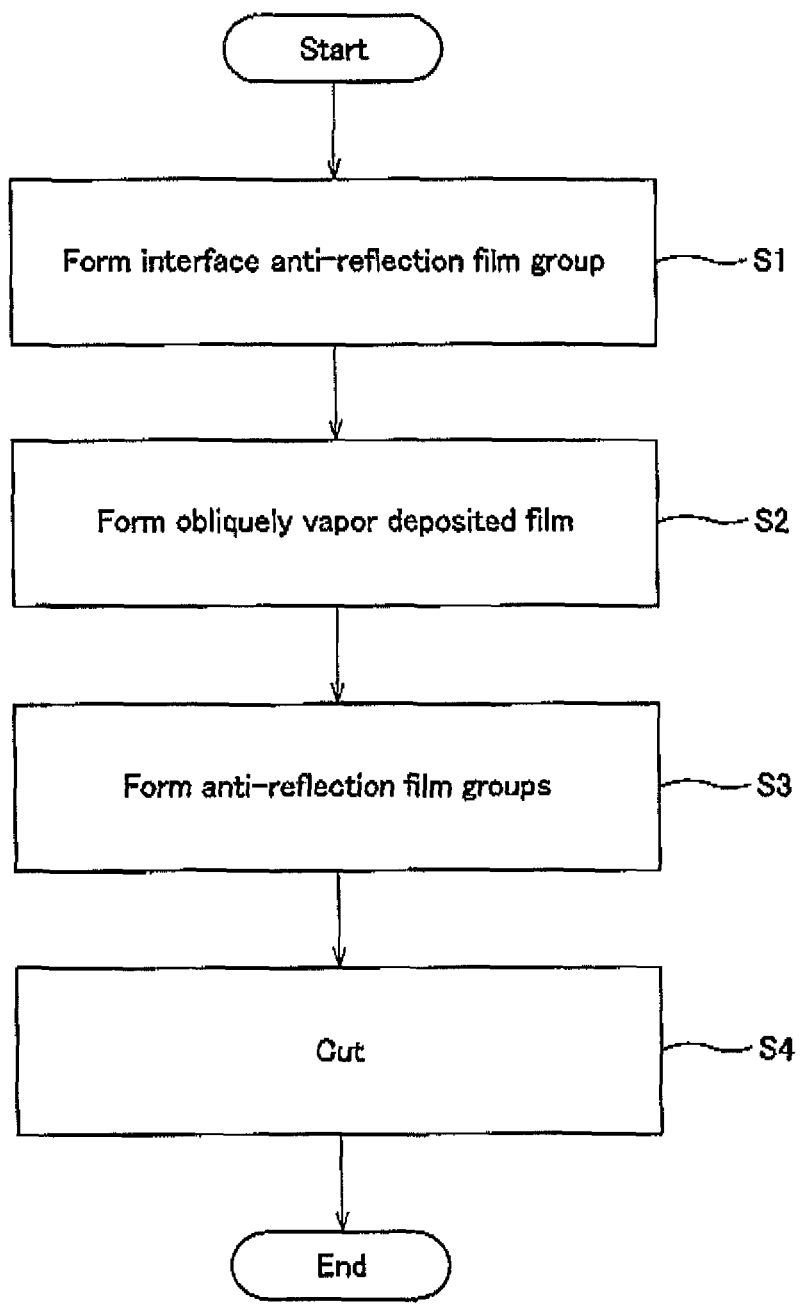
FIG. 2 is a flowchart showing the manufacturing method for the phase difference element according to the embodiment of the present invention.

A manufacturing method for a phase difference element of the present embodiment will now be described. FIG. 2 depicts a flowchart showing the manufacturing method for the phase difference element of the present embodiment.

Initially, in a step S1, a plurality of films of a dielectric material(s), as the interface anti-reflection film group, are formed on the transparent substrate by sputtering, CVD or vapor deposition. As the dielectric materials, an oxide of Ta, Zr, Ti, Si, Al, Nb or La or a fluoride of Mg may be used either alone or in combination. The refractive index of the interface anti-reflection film group 12 is to be intermediate between the refractive index of the transparent substrate 11 and that of the obliquely vapor deposited film 13. The uppermost film of the interface anti-reflection film group 12 in contact with the obliquely vapor deposited film 13 is preferably a $SiO_2$ film.

In a step S2, a high refractive index material is deposited by oblique vapor deposition on the interface anti-reflection film group 12. Specifically, the transparent substrate 11 is rotated 180° in the planer direction each time a new layer is formed, thereby forming the obliquely vapor deposited film 13 composed by a plurality of layers having different film-forming directions. It is noted that the film thickness of each layer of the multi-layer structure is to be less than the wavelength of light in use. A low refractive index material may also be mixed into the obliquely vapor deposited film 13 to improve resistance against moisture. The high refractive index material may be exemplified by oxides of Ta, Zr, Ti, Si, Al, Nb or La, either alone or in combination.

After deposition of the obliquely vapor deposited film 13, processing of annealing is carried out for decoloring and for evaporation of moisture adsorbed into interstices of a columnar structure. The annealing processing is preferably carried out at a temperature not lower than 100° C. to permit sufficient evaporation of moisture in the interstices of the columnar structure. If the temperature is too high, there is a risk that the interstices are decreased in volume due to growth of the columnar structure, thus reducing the birefringence and lowering the transmission factor. It is therefore desirable that the annealing temperature is not higher than 300'C. It is also necessary to prevent moisture in atmosphere from intruding into or exiting from the obliquely vapor deposited film 13 after the processing of annealing. To this end, the film of a dielectric material of high denseness is to be formed by plasma CVD.

In a step S3, the anti-reflection (AR) film groups 15A, 15B are formed on both the front and reverse surfaces of a resulting multi-layer structure to form a multi-layered composite film. The AR film groups may be multi-layer thin films composed by routinely used high refractive index films and low refractive index films.

In a step S4, the multi-layered composite film is cut to a desired size. For the cutting, a cutting device, such as a glass scriber, may be used.

By the above manufacturing method, it is possible to manufacture a phase difference element in which reflection of incident light has been diminished and in which improvement has been made in viewing angle dependency.

3. Example Application to a Liquid Crystal Projector

An example application of the phase difference element of the present embodiment, in which the phase difference element is loaded on a reflection liquid crystal projector for use as a quarter wave plate, will now be described. In the reflection liquid crystal projector, which makes use of a reflection liquid crystal cell, plane polarized light is made to fall on a picture image displayed on the liquid crystal cell. Pre-set plane polarized light is taken out from elliptically polarized light reflected by pixels on the cell corresponding to the picture image, for projection on a screen by a projection lens.

Figure 3:
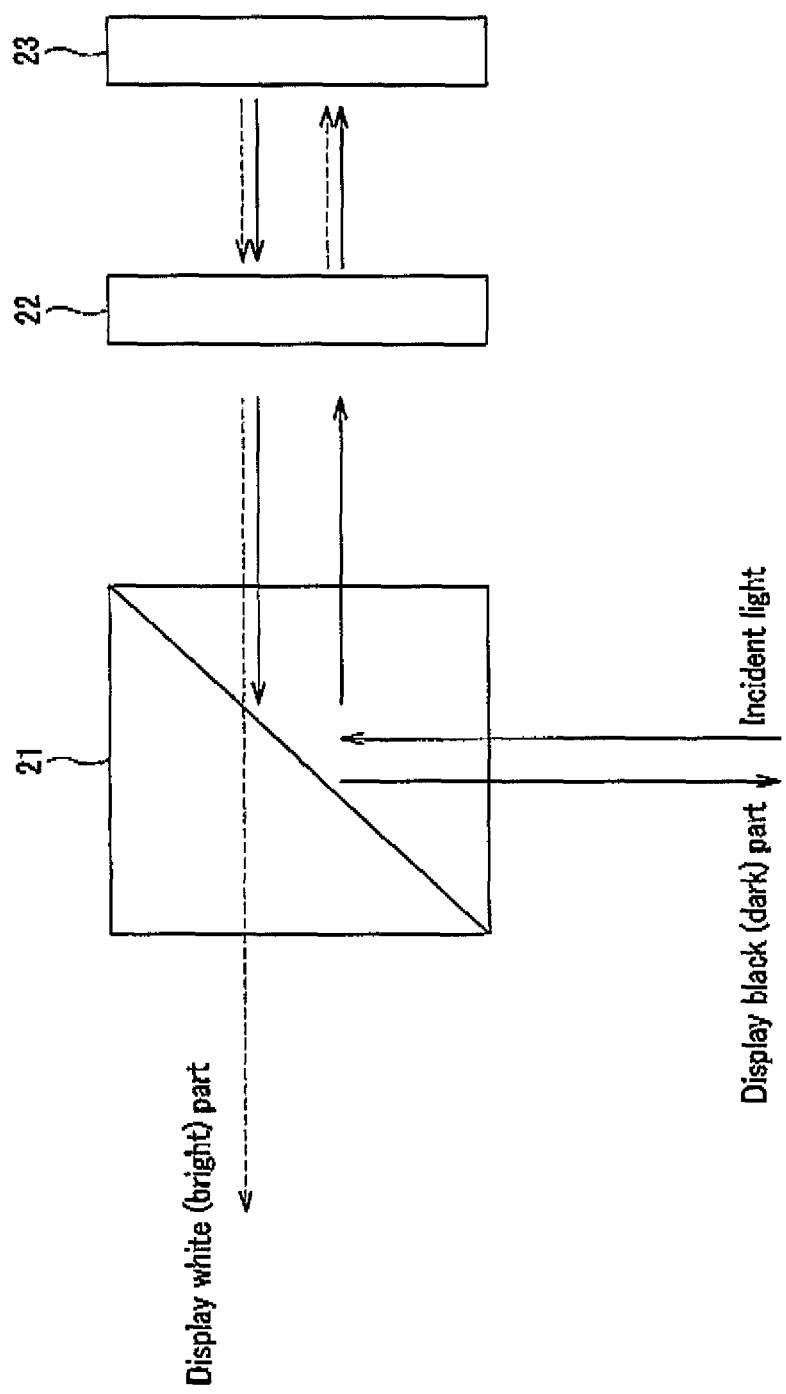
FIG. 3 is a schematic cross-sectional view showing the configuration of part of an optical engine used in a reflection liquid crystal projector.

FIG. 3 depicts a schematic cross-sectional view in which the structure of a portion of an optical engine used in the reflection liquid crystal projector is shown. This reflection liquid crystal projector is provided with a polarization beam splitter 21, a quarter wave plate 22 exploiting the present technique, and a liquid crystal cell 23.

In this reflection liquid crystal projector, light emitted from a light source is converted into plane polarized light, which is then decomposed into red (R), green (G) and blue (B) components. Each of these components is then made to fall on the polarization beam splitter 21 provided from one color component to another. The s-polarized light, reflected by the polarization plane of the polarization beam splitter 21, or the p-polarized light, transmitted through the polarization plane, is incident on the reflection liquid crystal cell 23 so as to be modulated from pixel to pixel. The reflection liquid crystal cell 23 radiates reflected light thus modulated from pixel to pixel. The reflected light radiated is then returned to each polarization beam splitter 21. At this time, not only collimated light but also light other than the collimated light, that is, light at a certain angle, is incident on each polarization beam splitter 21. If the angle the light incident on the polarization beam splitter 21 makes with the optical axis of light incidence becomes larger, the picture image projected is deteriorated in contrast. For this reason, the quarter wave plate 22 is provided half-way between the polarization beam splitter 21 and the liquid crystal cell 23.

If the incident light, assumed here to be s-polarized light, is slightly reflected on a substrate/vapor deposited film interface of the quarter wave plate 22, the incident light proceeds through the quarter wave plate in the forward direction and then in the reverse or backward direction. Hence, the incident light behaves in much the same way as when the quarter wave plate is a half wave plate, such that the light is converted from the s-polarized light into p-polarized light. If, in this case, it is desired that the picture image is projected in black by the reflection liquid crystal projector, the p-polarized light is returned to the polarization beam splitter so as to be projected as bright part (white representation). In this case, the projected picture image is deteriorated in contrast significantly.

However, in the quarter wave plate 22, manufactured in accordance with the present technique, reflection of incident light has been decreased. Thus, the light returned from the liquid crystal cell 23 to the polarization beam splitter 21 is all s-polarized light, that is, there is no light returned as p-polarized light to the polarization beam splitter 21. Hence, the projected picture image may be improved in contrast appreciably.

Moreover, in the reflection liquid crystal projector, the quarter wave plate 22 and the liquid crystal cell 23 usually exhibit angle dependency of the order of ±10° with respect to the incident light. In the quarter wave plate 22 according to the present technique, the angle dependency of the phase difference to the incident light is small and is symmetrical with respect to the incident light from the vertical direction, thus allowing improving brightness and contrast.

The application of the phase difference element employing the present technique is not limited to the above mentioned example application. The phase difference element of the present invention may thus be applied to optical instruments, such as optical pickups or laser devices.

EXAMPLES

4. Examples

Certain Examples of the present invention will now be described. It is rioted that these Examples are given only by way of illustration and not by way of restricting the present invention.
<4.1 Simulation for Forming an Interface Anti-Reflection Film of a Phase Difference Element>

In forming an interface anti-reflection film of a phase difference element, simulation was conducted. Here, comparison was made between a phase difference element not including an interface anti-reflection film and a phase difference element including the interface anti-reflection film. As the interface anti-reflection film, capable of decreasing the reflectance, the interface anti-reflection film of a three-layer structure composed by alternately arranged high and low refractive index films was taken up for studies.
[Phase Difference Element not Including the Interface Anti-Reflection Film]

Figure 4:
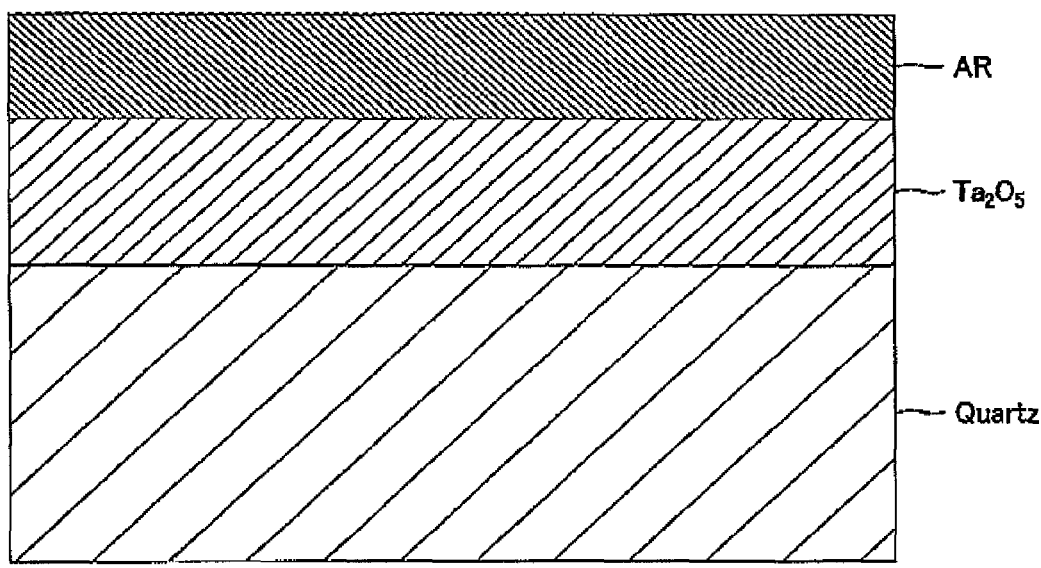
FIG. 4 is a schematic view showing a simulation model of a phase difference element not provided with an interface anti-reflection film group.

FIG. 4 schematically shows a simulation model of the phase difference element not including the interface anti-reflection film. In this phase difference element, the transparent substrate is formed of quartz, and the obliquely vapor deposited film 13 is formed of $Ta_2O_5$. An anti-reflection (AR) film was formed only on a front surface of the resulting composite film.

Figure 5:
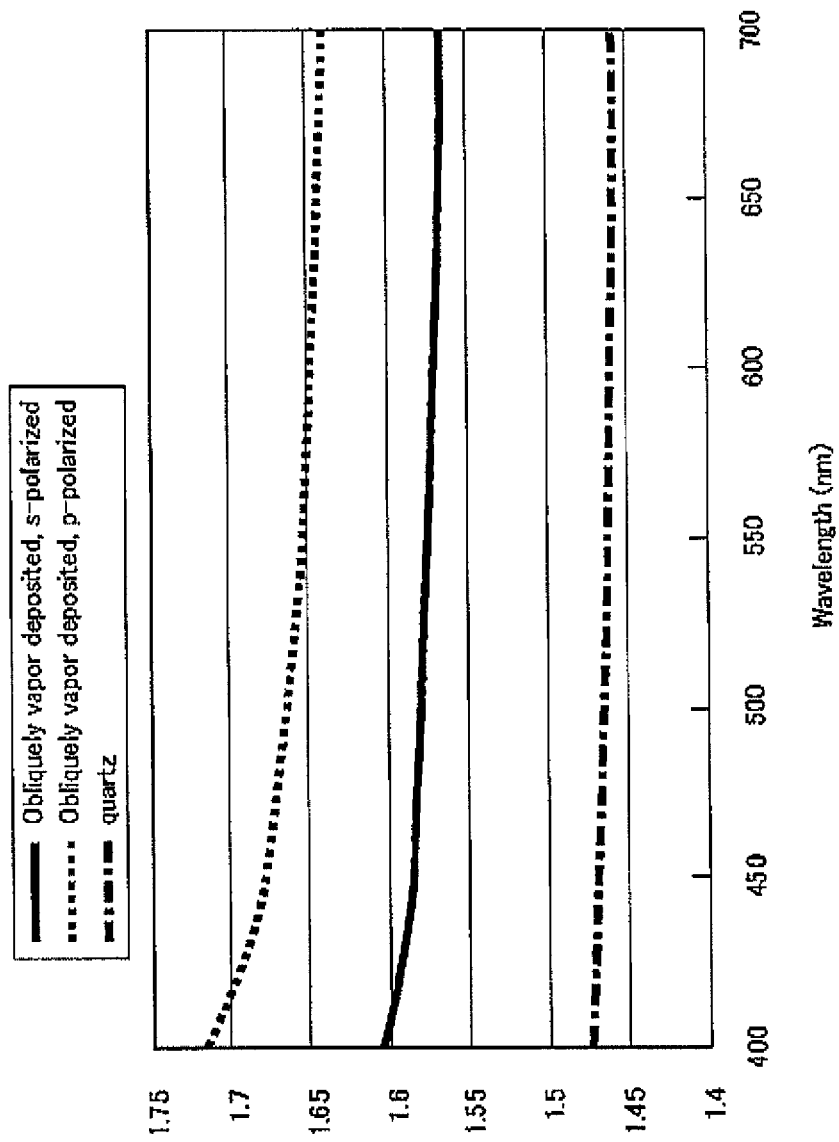
FIG. 5 is a graph showing the scattering with wavelengths of the refractive indices of a quartz substrate and an obliquely vapor deposited film of $Ta_2O_5$.
Figure 6:
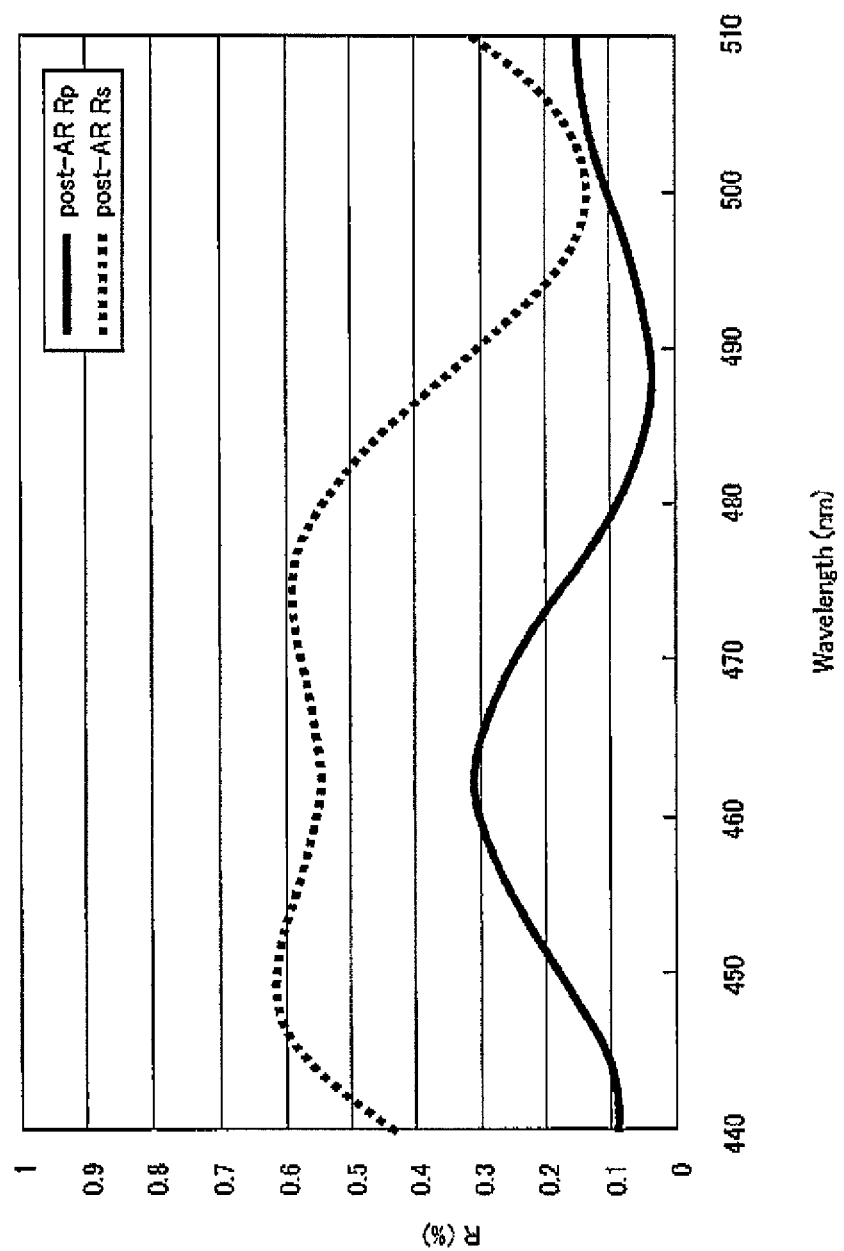
FIG. 6 is a graph showing the reflectance of a phase difference element not carrying the interface anti-reflection film group thereon.

FIG. 5 depicts a graph for illustrating the scattering of the refractive indices with wavelengths of the quartz substrate and the obliquely vapor deposited film of $Ta_2O_5$. FIG. 6 depicts a graph showing the refractive indices of the phase difference element not including the interface anti-reflection film group.

It is seen from FIGS. 5 and 6 that the refractive index of the quartz substrate and that of the obliquely vapor deposited film 13 differ appreciably from each other, such that, with the structure of the phase difference element shown in FIG. 4, it is difficult to lower the refractive indices Rp, Rs of both s- and p-polarized components.
[Phase Difference Element Including the Interface Anti-Reflection Film Group]

Figure 7:
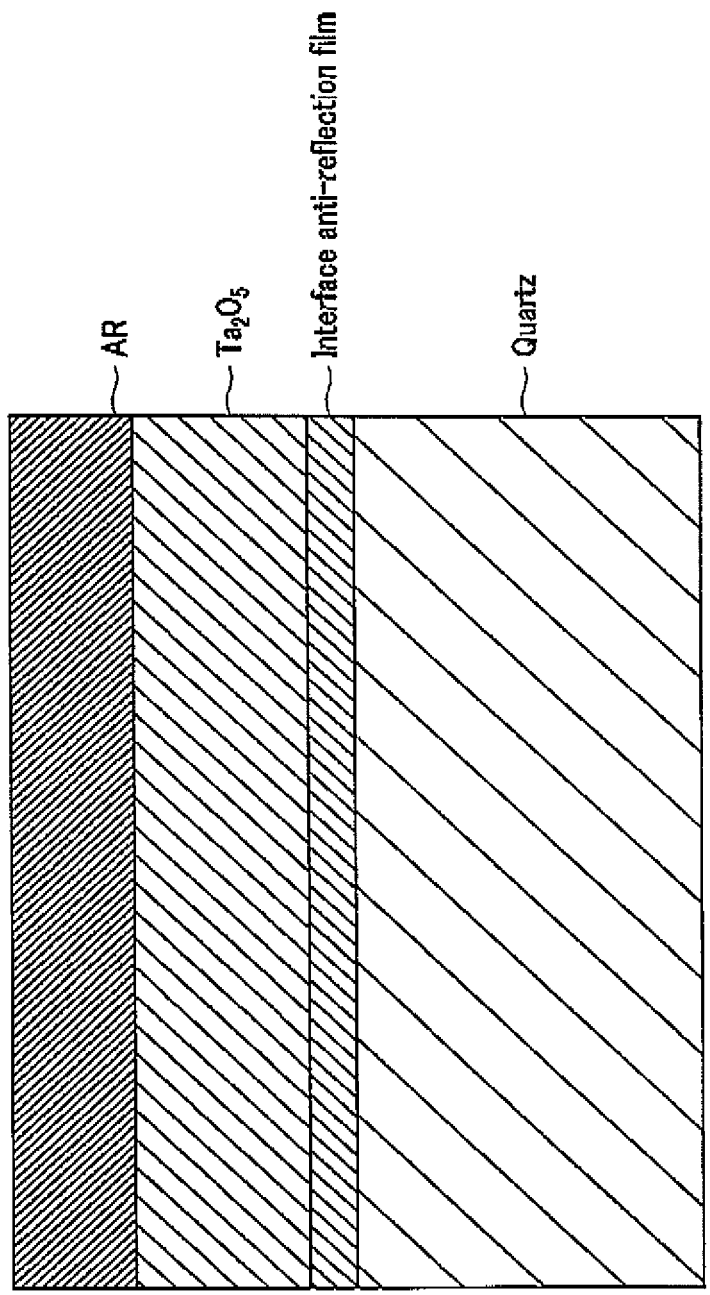
FIG. 7 is a schematic view showing a simulation model of a phase difference element carrying the interface anti-reflection film group thereon.

Next, simulation was conducted for a phase difference element in which an interface anti-reflection film group was formed between the transparent substrate and the obliquely vapor deposited film. In this phase difference element, the interface anti-reflection film group was formed between the transparent substrate and the obliquely vapor deposited film, as shown in FIG. 7. Otherwise, the phase difference element is similar in structure to the phase difference element shown in FIG. 4, that is, the transparent substrate 1 is formed of quartz, and the obliquely vapor deposited film 13 of $Ta_2O_5$. An anti-reflection (AR) film was formed only on a front surface of the resulting composite film.

Figure 8:
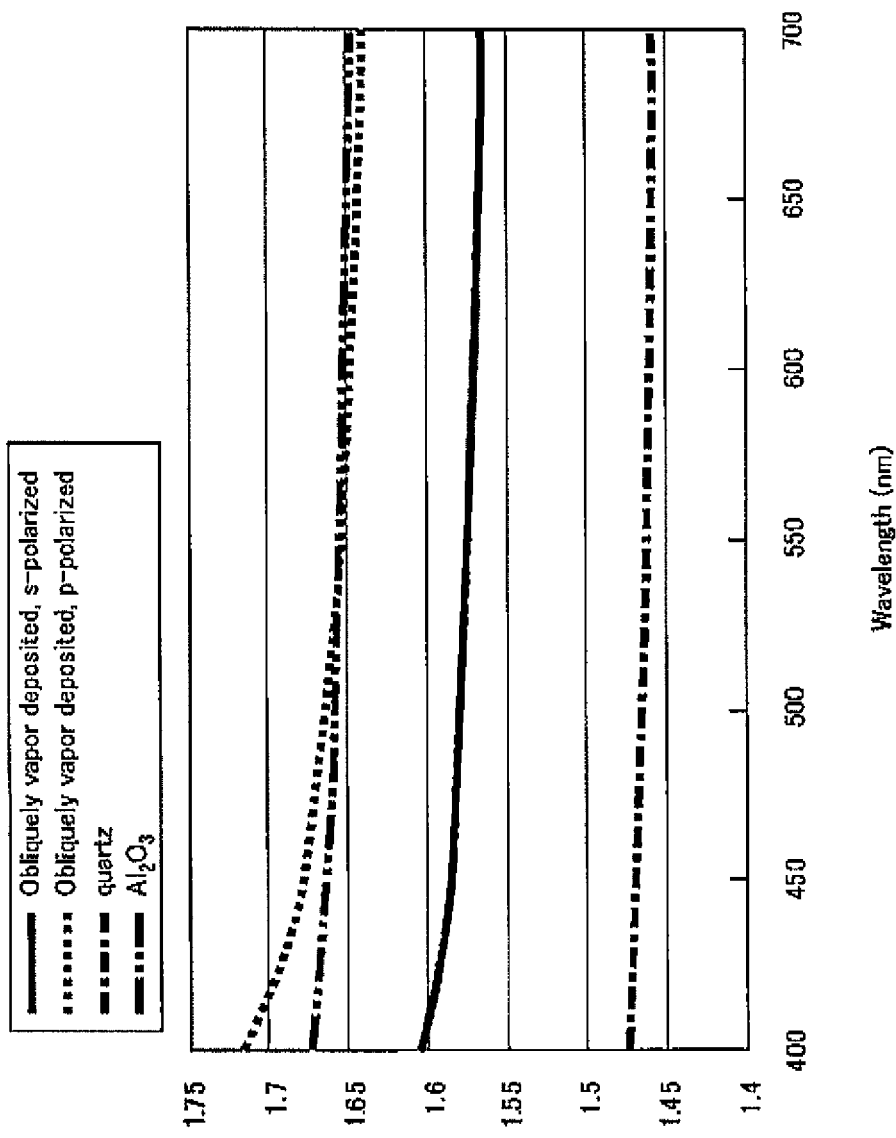
FIG. 8 is a graph showing the scattering with wavelengths of the refractive indices of an interface anti-reflection film group of $Al_2O_3$, a quartz substrate and an obliquely vapor deposited film of $Ta_2O_5$.
Figure 9:
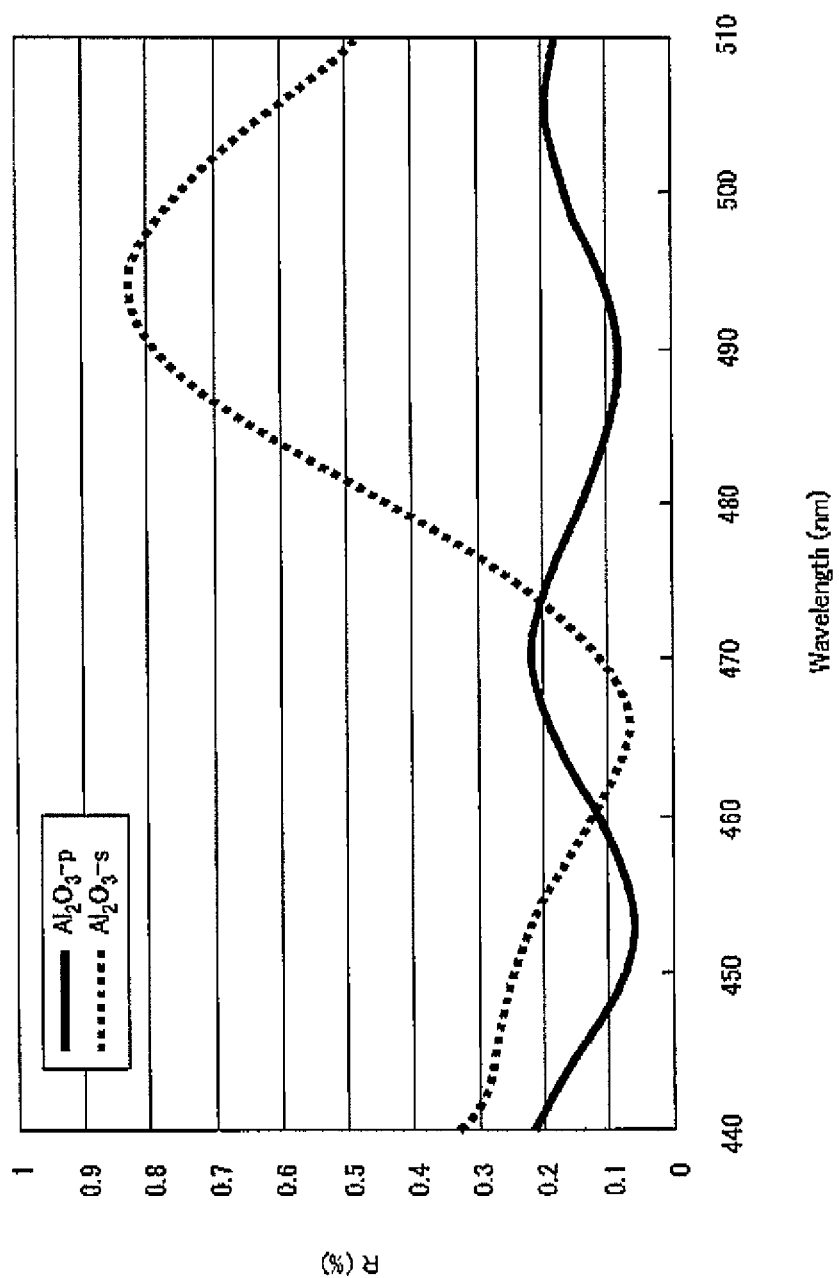
FIG. 9 is a graph showing the reflectance of the phase difference element carrying thereon an interface anti-reflection film group of $Al_2O_3$.

FIG. 8 depicts a graph for illustrating the scattering of refractive indices with wavelengths of the interface anti-reflection film group of $Al_2O_3$, quartz substrate and the obliquely vapor deposited film of $Ta_2O_3$. FIG. 9 depicts a graph for illustrating the reflectance of the phase difference element including the interface anti-reflection film group of $Al_2O_3$.

It is seen from FIGS. 8 and 9 that the refractive index of the interface anti-reflection film group of $Al_2O_3$ is higher than that of the obliquely vapor deposited film of $Ta_2O_3$, such that, in the blue light wavelength range, the effect in reducing the reflectance (Rp, Rs) is only small.

Figure 10:
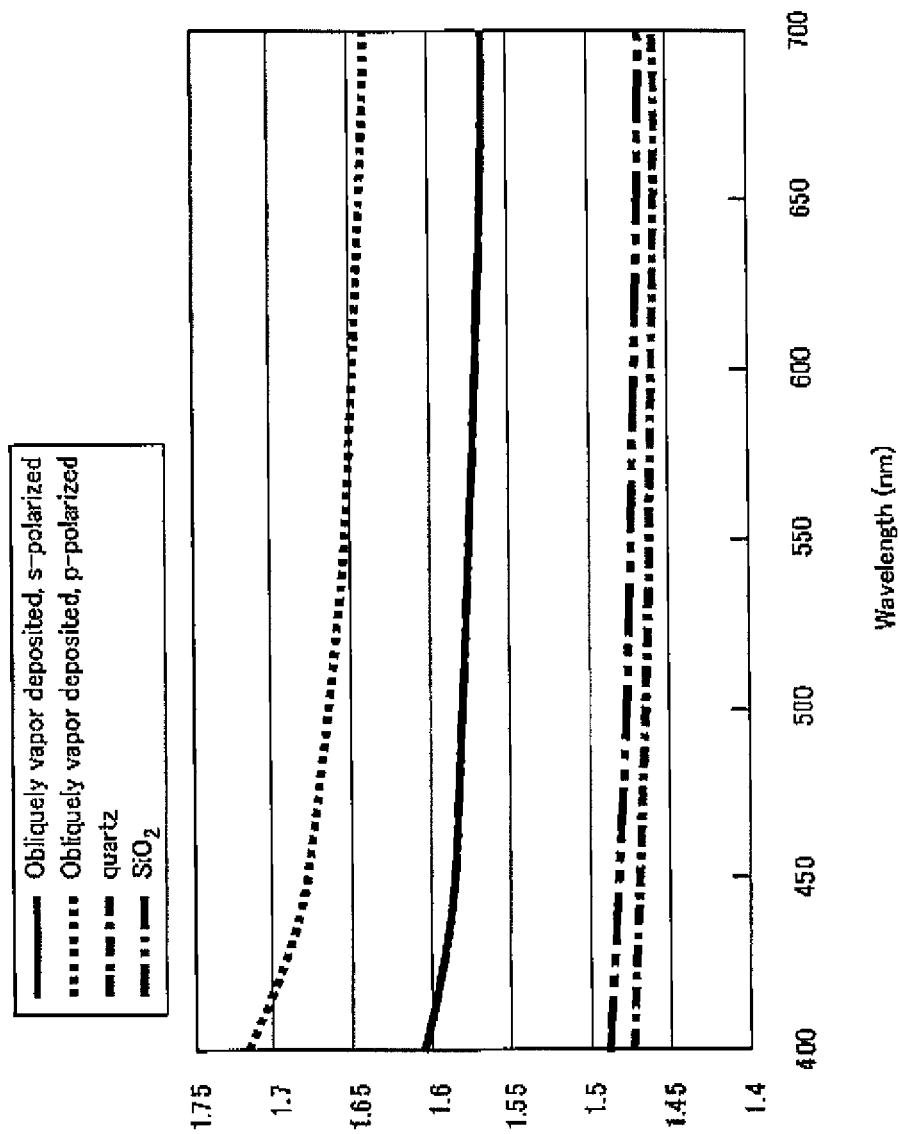
FIG. 10 is a graph showing the scattering with wavelengths of an interface anti-reflection film group of $SiO_2$, a quartz substrate and an obliquely vapor deposited film of $Ta_2O_5$.
Figure 11:
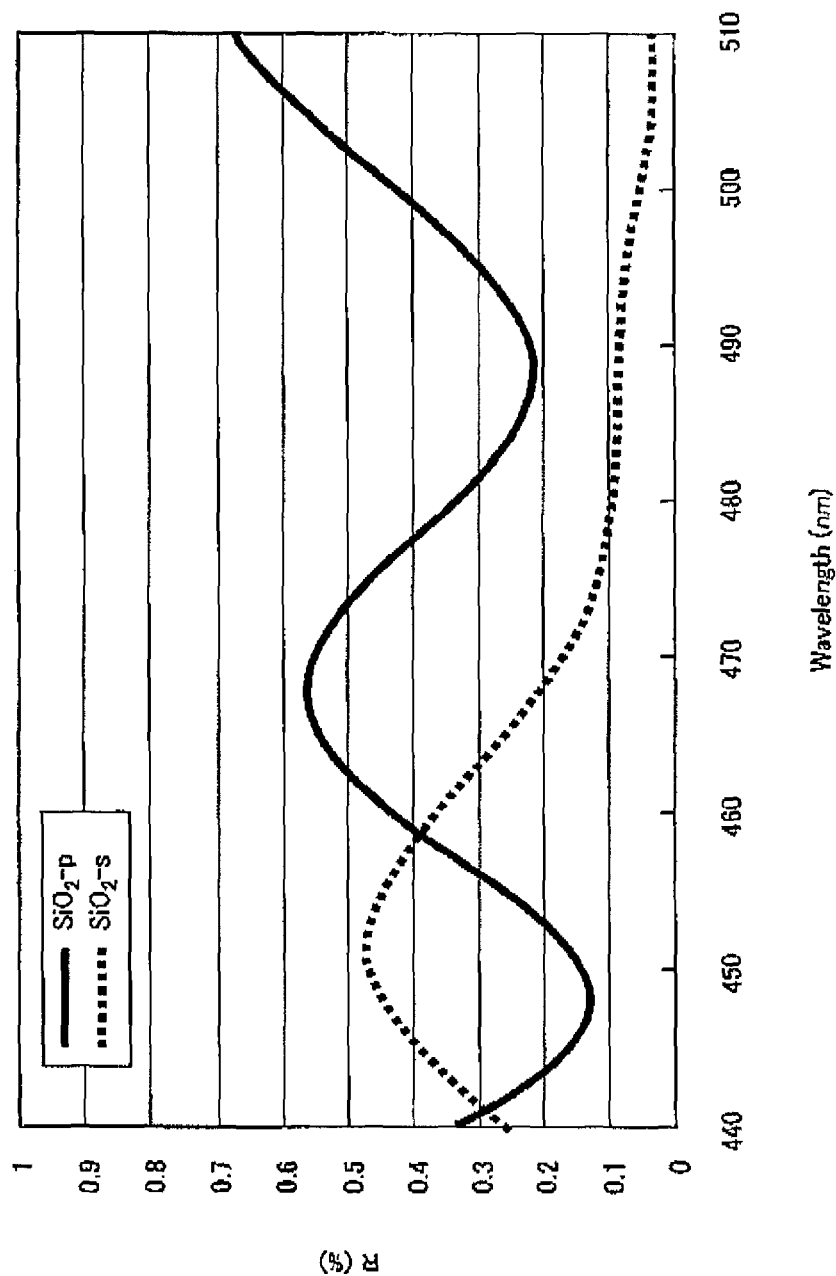
FIG. 11 is a graph showing the reflectance of the phase difference element carrying thereon an interface anti-reflection film group of $SiO_2$.

FIG. 10 depicts a graph showing the scattering of refractive indices with wavelengths of the interface anti-reflection film group of $SiO_2$, quartz substrate and the obliquely vapor deposited film of $Ta_2O_3$. FIG. 11 depicts a graph showing the reflectance of the phase difference element including the interface anti-reflection film group of $SiO_2$.

It is seen from FIGS. 10 and 11 that the refractive index of the interface anti-reflection film group of $SiO_2$ is lower than that of the quartz substrate, such that, in the blue light wavelength range, the effect in reducing the reflectance (Rp, Rs) is only small.

The refractive index of an optimum interface anti-reflection film, which will give a low value of the reflectance of the phase difference element, was found by simulation.

Figure 12:
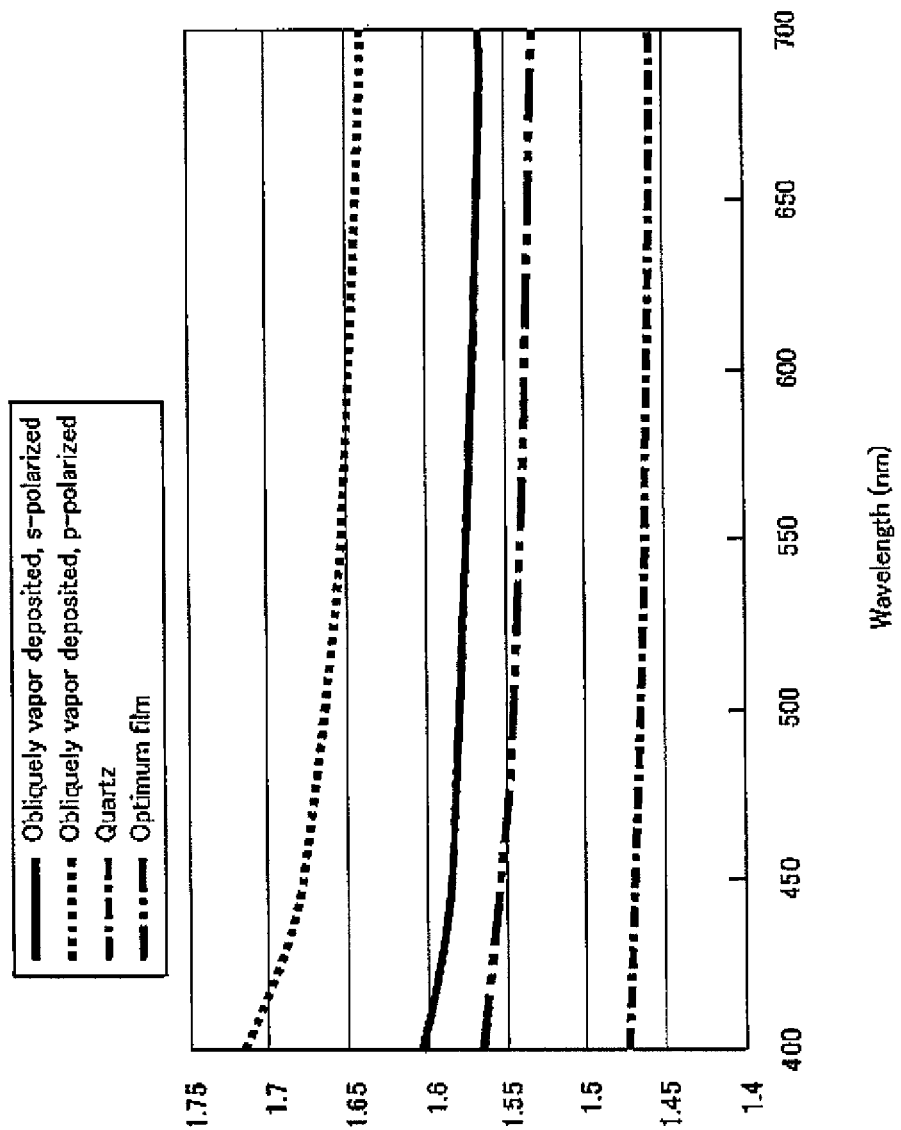
FIG. 12 is a graph showing the scattering with wavelengths of an optimum interface anti-reflection film, a quartz substrate and an obliquely vapor deposited film of $Ta_2O_5$.
Figure 13:
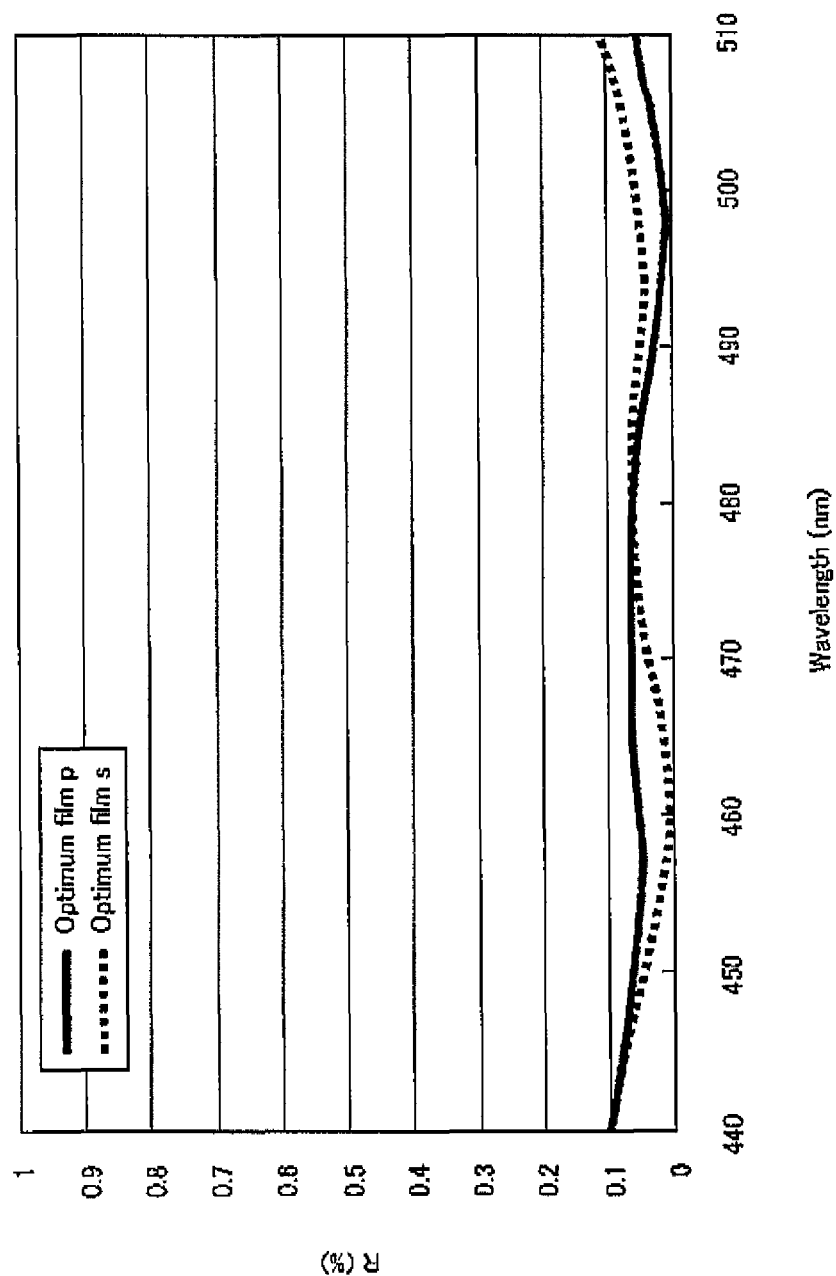
FIG. 13 is a graph showing the reflectance of the phase difference element carrying thereon the optimum interface anti-reflection film.

FIG. 12 depicts a graph showing the scattering of refractive indices with wavelengths of the optimum interface anti-reflection film, quartz substrate and the obliquely vapor deposited film of $Ta_2O_3$. FIG. 13 depicts a graph showing the reflectance of the phase difference element including the optimum interface anti-reflection film.

It is seen from FIGS. 12 and 13 that the refractive index of the optimum interface anti-reflection film is higher than that of the quartz substrate, while being lower than that of the obliquely vapor deposited film. The optimum interface anti-reflection film has a higher effect in reducing the reflectance (Rp, Rs), such that it is capable of reducing the reflectance (Rp, Rs) to not greater than 0.2% in the blue color wavelength range.

It is seen from above that, with the refractive index of the interface anti-reflection film group being higher than that of the transparent substrate and lower than that of the obliquely vapor deposited film, it is possible to reduce reflectance of the phase difference element.
[Interface Anti-Reflection Film Group of the Three-Layer Structure]

There is no material that, when used as a single layer, will satisfy the optimum refraction index. Hence, simulation was conducted of an optimum interface anti-reflection film by layering. As a result of the simulation, it was found that the single-layer optimum interface anti-reflection film, with the optimum design film thickness, can also be obtained with a film of a three-layer structure in which a $SiO_2$ film, an $Nb_2O_5$ film and a $SiO_2$ film are layered in this order.

Figure 14:
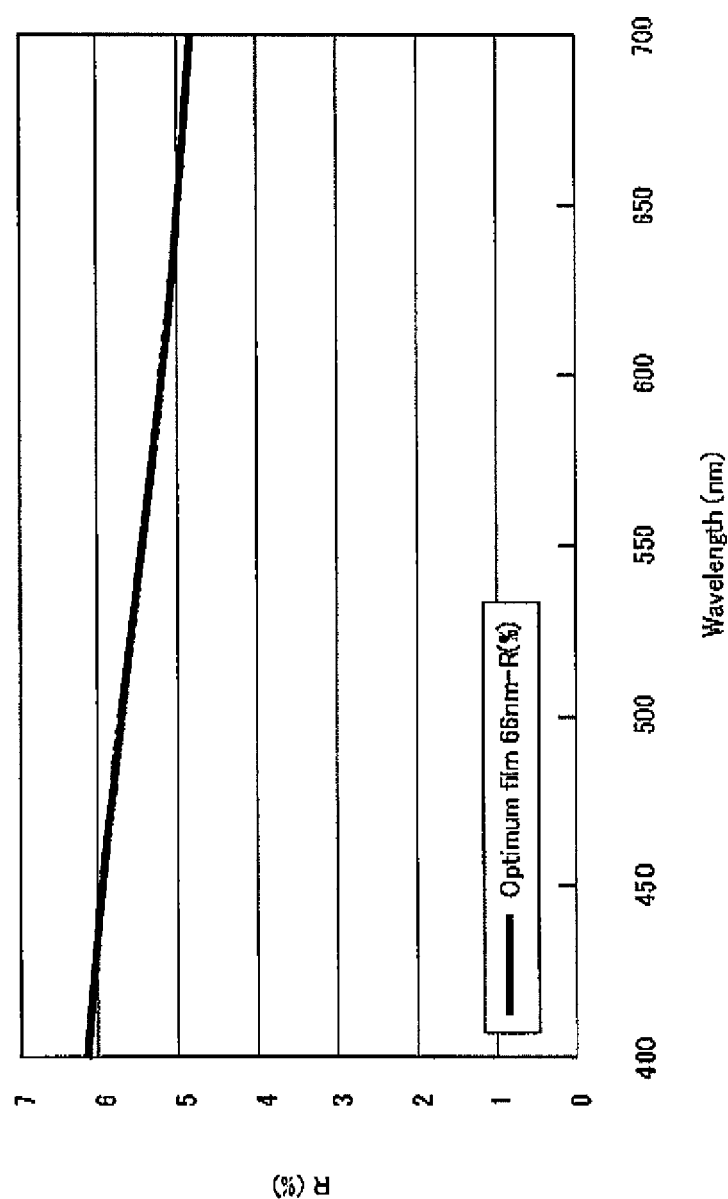
FIG. 14 is a graph showing the reflectance of the optimum anti-reflection film group.
Figure 15:
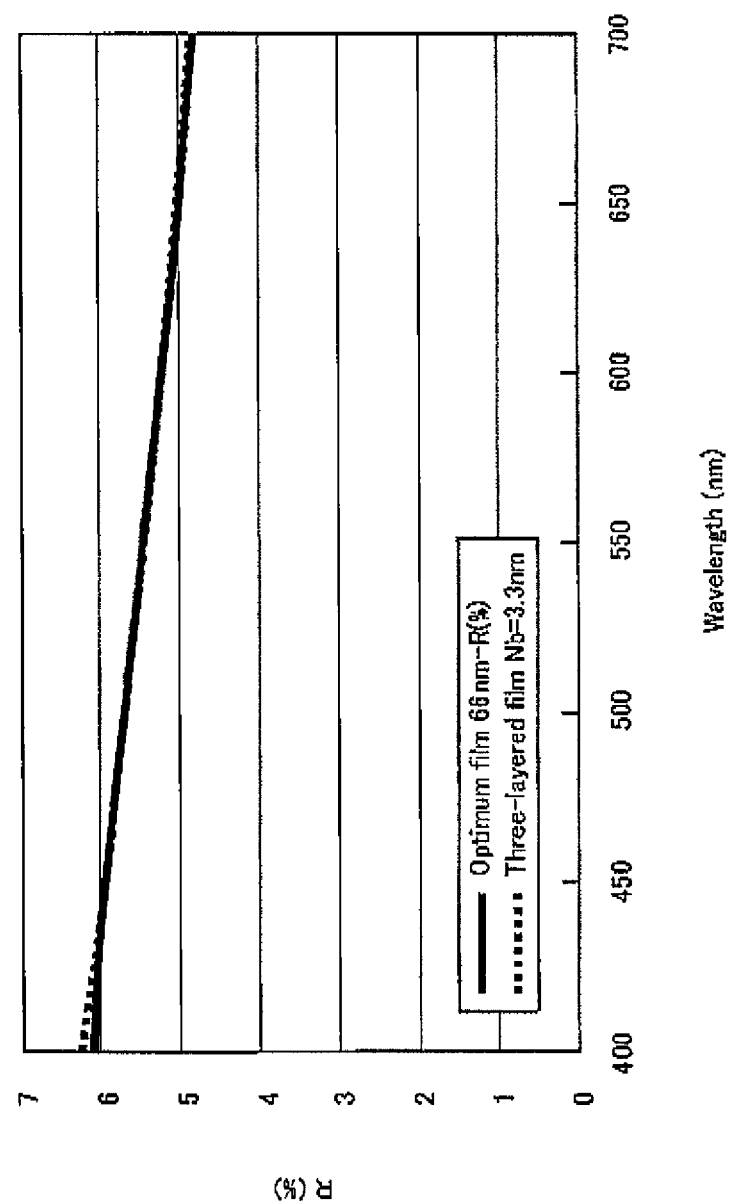
FIG. 15 is a graph showing the reflectance of a film of a three layer structure and the optimum anti-reflection film group.

FIG. 14 depicts a graph showing the reflectance of the optimum interface anti-reflection film. FIG. 15 depicts a graph showing the three-layered film structure and the optimum interface anti-reflection films. It is seen from the graph of FIG. 15 that, by layering the $SiO_2$ film to a thickness of 76 nm, the $Nb_2O_3$ film to a thickness of 3.3 nm and a $SiO_2$ film to a thickness of 44 nm, in this order, the reflectance of the resulting film structure is approximately equal to that of the optimum interface anti-reflection film.

Figure 16:
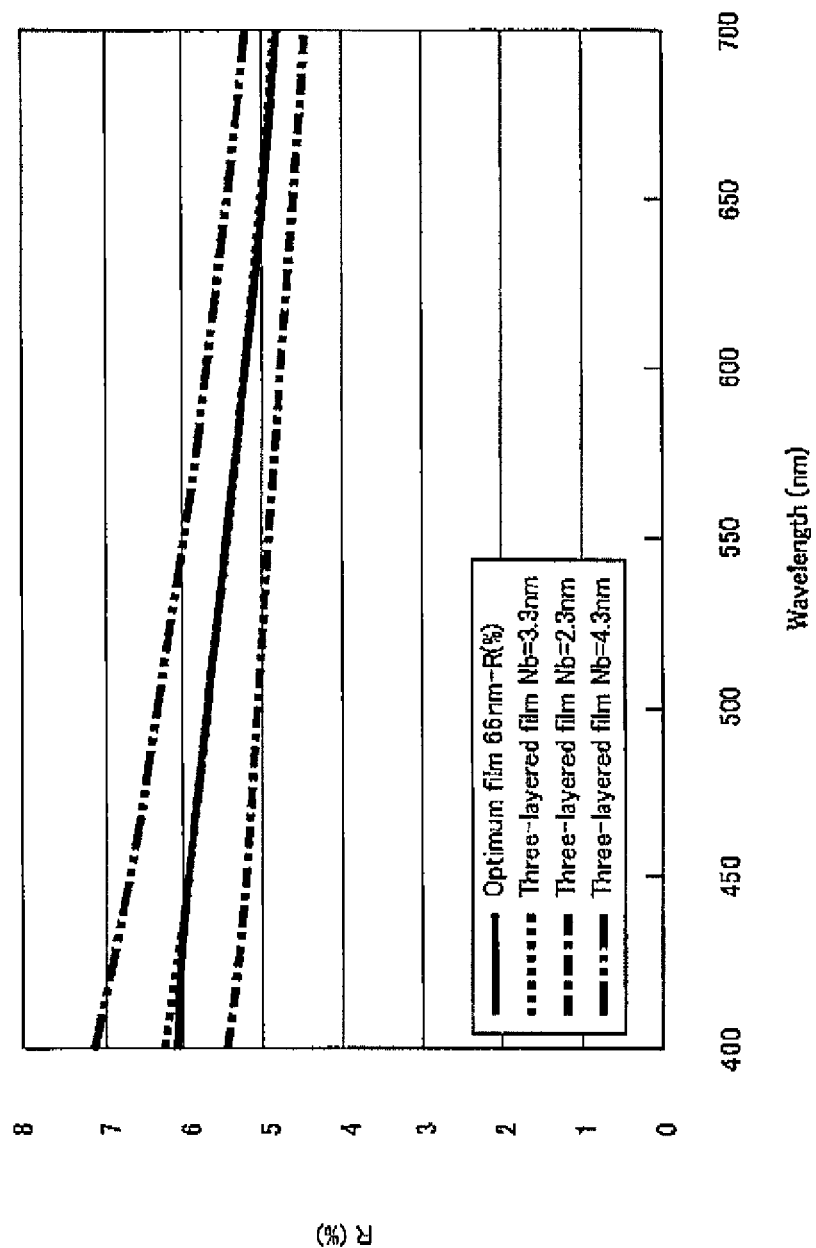
FIG. 16 is a graph showing the reflectance in case the thickness of the $Nb_2O_5$ film of the three layer structure is set to 2.3 nm, 3.3 nm or to 4.3 nm.

FIG. 16 depicts a graph showing the reflectance in case the thickness of the $Nb_2O_5$ film of the three-layer structure is set at 2.3 nm, 3.3 nm or at 4.3 nm. It is seen from the graph of FIG. 16 that, if the thickness of the $Nb_2O_5$ film is changed by ±1 nm, the reflectance is appreciably changed, so that the thickness of the $Nb_2O_5$ film performs a crucial role.

Figure 17:
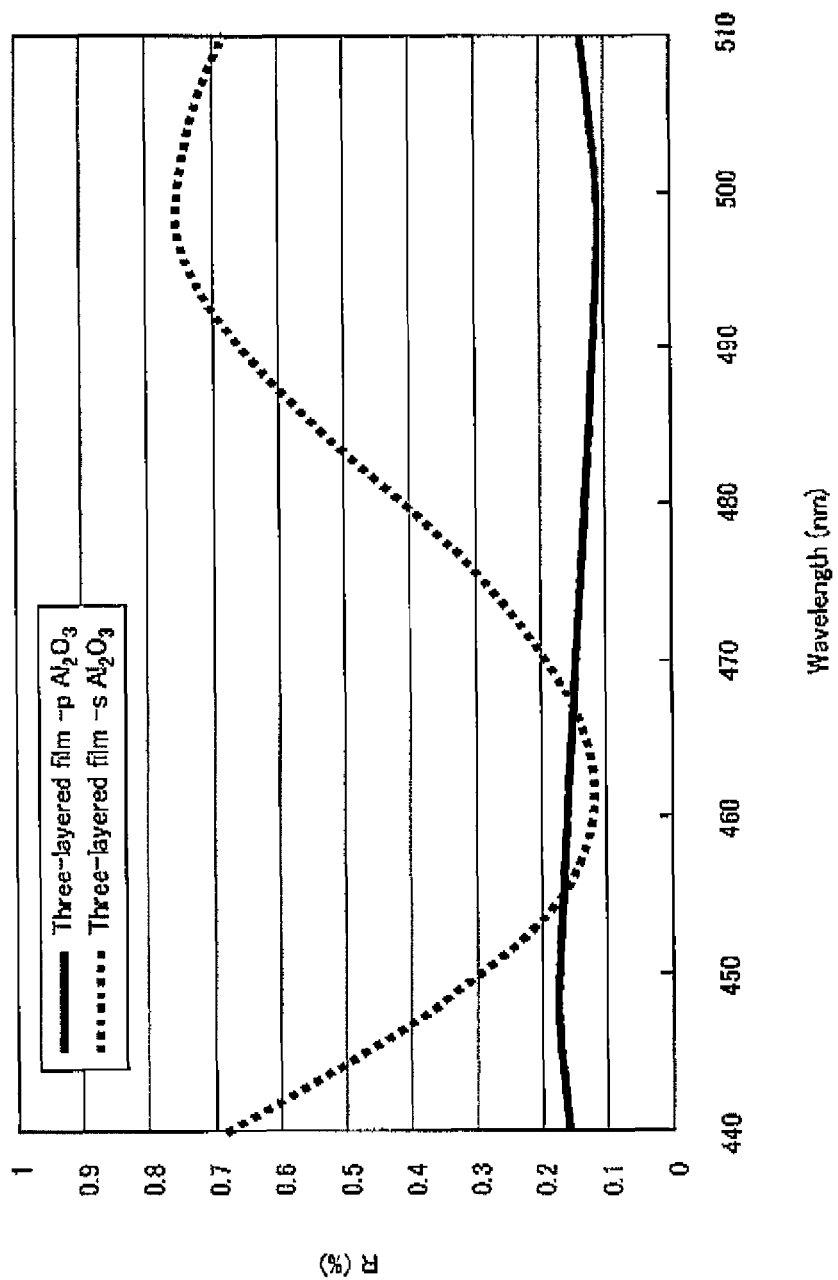
FIG. 17 is a graph showing the reflectance of a phase difference element in case the second layer of the three layer structure is an $Al_2O_3$ film.

FIG. 17 depicts a graph showing the reflectance of a phase difference element in case the second layer of the three layer structure is of $Al_2O_3$. It was attempted to replace the $Nb_2O_5$ film of the three layer structure by the $Al_2O_3$ film for optimization. It was found however that, since the refraction index of the $Al_2O_3$ film is only small, as shown in FIG. 17, the effect in reducing the reflectance (Rp, Rs) for the blue wavelength range was only small.

Figure 18:
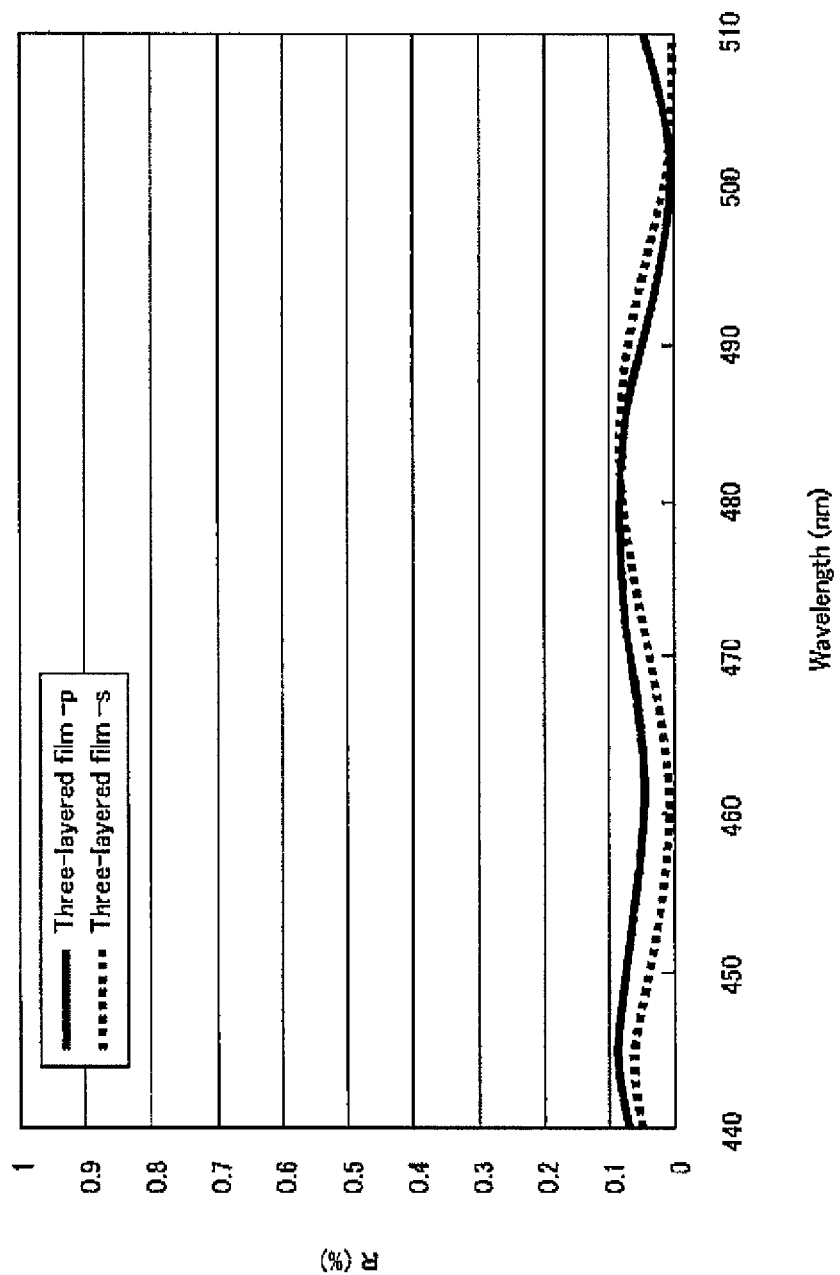
FIG. 18 is a graph showing the reflectance of a phase difference element in case the second layer of the three layer structure is an $Nb_2O_5$ film.

FIG. 18 is a graph showing the reflectance of the phase difference element in case the second layer of the three layer structure is $Nb_2O_5$. The thicknesses of the $SiO_2$ film, $Nb_2O_5$ film and the $SiO_2$ film were optimized at 95 nm, 3.0 nm and at 35 nm, respectively. The reflectance (Rp, Rs) not higher than $O_2\%$ could be obtained for the blue light wavelength range.

From the results shown in FIGS. 17 and 18, it is also seen that the second layer of the three layer structure may be replaced by a layer of a high refractive index material, such as $TiO_2$, $LaTiO_3$ or $Ta_2O_5$.

Figure 19:
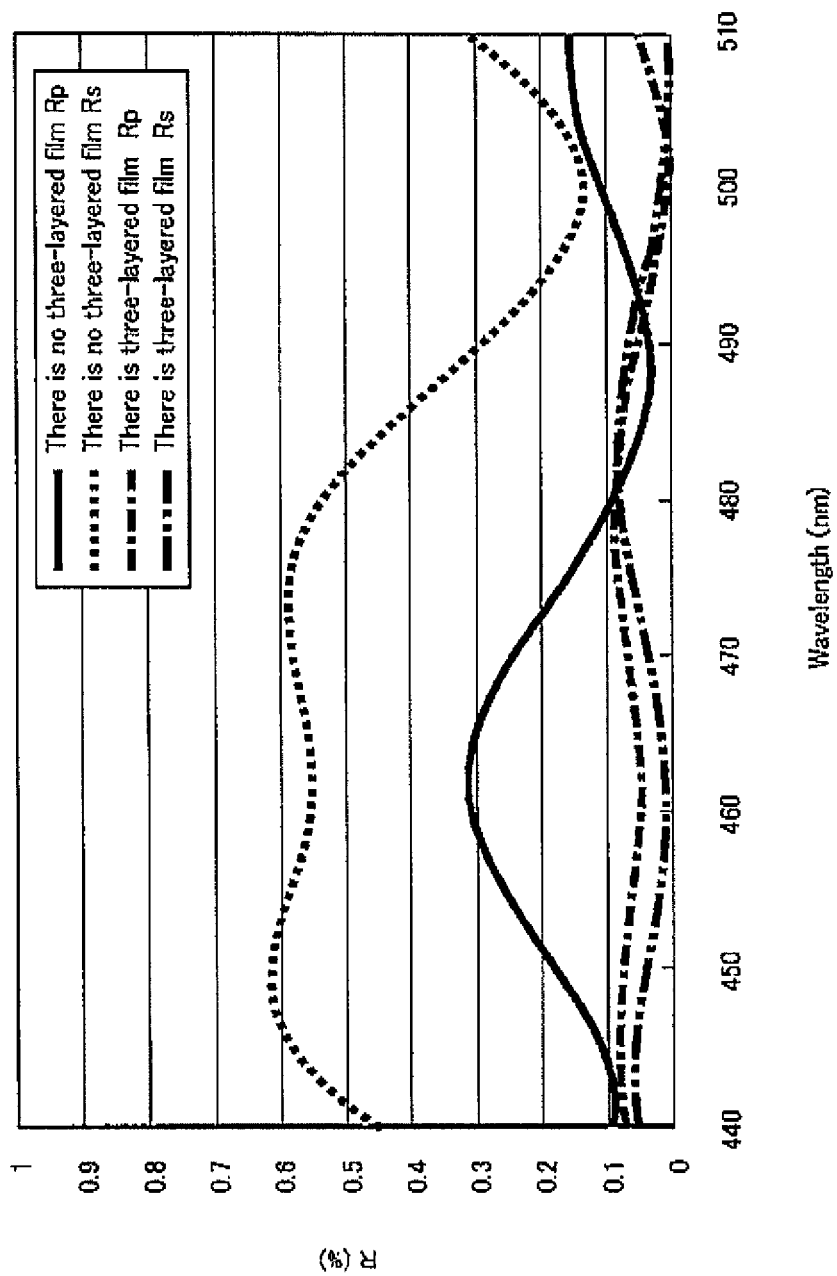
FIG. 19 is a graph showing the reflectance of a phase difference element carrying thereon an interface anti-reflection film group of a three layer structure and a phase difference element not carrying thereon the interface anti-reflection film group.

FIG. 19 is a graph showing the reflectance of a phase difference element having the interface anti-reflection film of the three layer structure, and that of a phase difference element not having the interface anti-reflection film. It is seen from the graph of FIG. 19 that, by providing the interface anti-reflection film group composed by one or more alternately high and low refraction index films between the transparent substrate and the obliquely vapor deposited film, it is possible to reduce the reflectance (Rp, Rs) of the phase difference element.

[Relationship Between the Obliquely Vapor Deposited Film and the Interface Anti-Reflection Film Group]

Simulation was conducted to search into the relationship between the refractive index of the obliquely vapor deposited film and that of the interface anti-reflection film of the three layer structure, composed by the $SiO_2$ film, $Nb_2O_5$ film and the $SiO_2$ film, deposited in this order. It is noted that the refractive index of the transparent substrate for the wavelength of 450 nm was set at 1.47.

Figure 20:
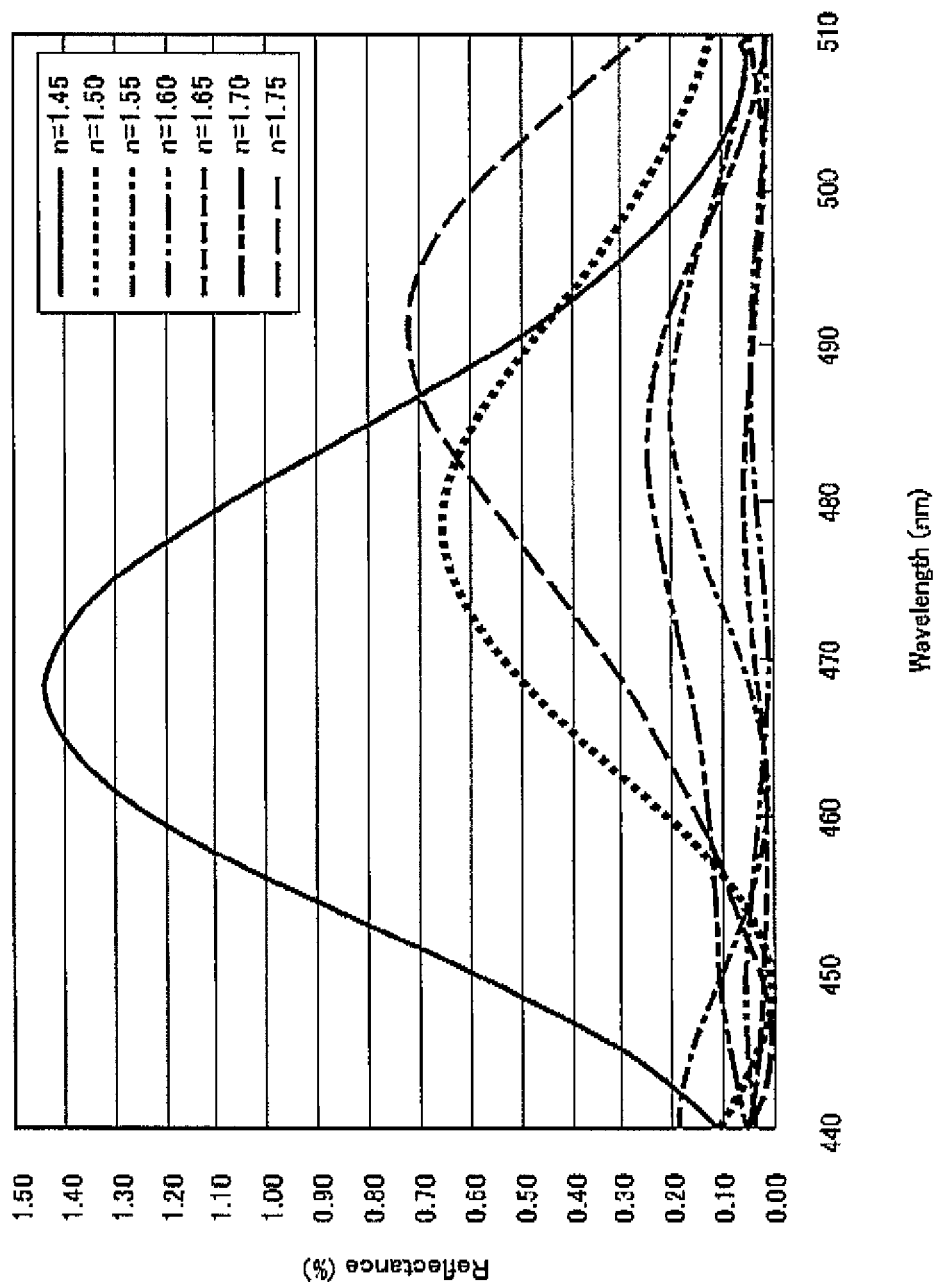
FIG. 20 is a graph showing the relationship between the reflectance of a phase difference element carrying thereon an interface anti-reflection film group of a three layer structure and refractive index of an obliquely vapor deposited film.

FIG. 20 depicts a graph showing the relationship between the reflectance of a phase difference element including an interface anti-reflection film group of a three layer structure and the refractive indices of the obliquely vapor deposited film. It is noted that the interface anti-reflection film group used is of the three layer structure composed of the $SiO_2$ film with a film thickness of 93 nm, the $Nb_2O_5$ film, with a film thickness of 3 nm and the $SiO_2$ film, with the film thickness of 35 nm, deposited in this order.

It is seen from the graph shown in FIG. 20 that, with the refractive indices $n_{oblx}$, $n_{obly}$ ($n_{oblx} > n_{obly}$) of the two planer axes of the obliquely vapor deposited film, perpendicular to each other, in a range from 1.55 or more to 1.7 or less, the reflectance to light in the blue wavelength range (440 to 510 nm) is 0.3% or less.

Table 1 shows the result of simulation of the effective film thickness range of the $Nb_2O_5$ film against the refractive indices $n_{oblx}$, $n_{obly}$ ($n_{oblx} > n_{obly}$) of the obliquely vapor deposited film.

TABLE 1

| $n_{oblx}$ | $n_{obly}$ | first layer $SiO_2$ (nm) | second layer $Nb_2O_5$ (nm) | third layer $SiO_2$ (nm) |
|---|---|---|---|---|
| 1.70 | 1.55 | 93.0 | 3.0~3.5 | 35.0 |
| | 1.60 | 93.0 | 3.0~4.5 | 35.0 |
| | 1.65 | 93.0 | 3.0~5.5 | 35.0 |
| | 1.70 | 93.0 | 3.0~5.5 | 35.0 |
| 1.65 | 1.55 | 93.0 | 1.0~3.5 | 35.0 |
| | 1.60 | 93.0 | 1.0~4.5 | 35.0 |

TABLE 1-continued

| $n_{oblx}$ | $n_{obly}$ | first layer $SiO_2$ (nm) | second layer $Nb_2O_5$ (nm) | third layer $SiO_2$ (nm) |
|---|---|---|---|---|
| | 1.65 | 93.0 | 1.0~5.5 | 35.0 |
| 1.60 | 1.55 | 93.0 | 0.5~3.5 | 35.0 |
| | 1.60 | 93.0 | 0.5~4.5 | 35.0 |
| 1.55 | 1.55 | 93.0 | 0.5~3.5 | 35.0 |

It is seen that, with the refractive indices $n_{oblx}$, $n_{obly}$ ($n_{oblx} > n_{obly}$) of the obliquely vapor deposited film equal to 1.55, the effective film thickness range of the $Nb_2O_5$ film is 0.5~3.5 nm, and that, with the refractive indices $n_{oblx}$, $n_{obly}$ ($n_{oblx} > n_{obly}$) equal to 1.70, the effective film thickness range of the $Nb_2O_5$ film is 3.0~5.5 nm.

Figure 21:
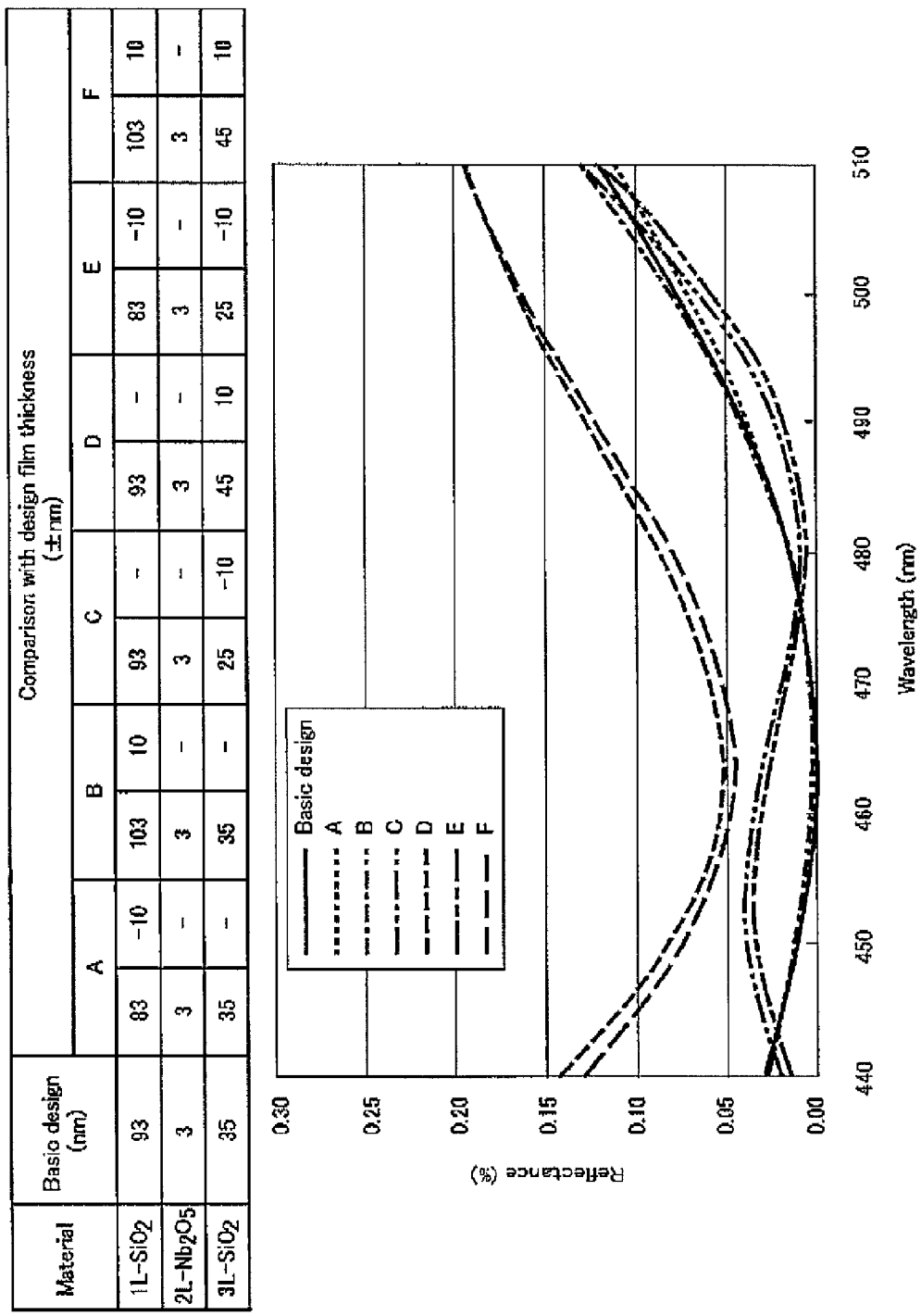
FIG. 21 is a graph showing the reflectance of a phase difference element in case of varying the thicknesses of the first and third layers of $SiO_2$ of the three layer structure, with comparison to design film thicknesses shown in a tabulated form.

Simulation was also conducted as the film thickness of the $Nb_2O_5$ film of the second layer of the three layer structure was set at 3 nm and as the film thicknesses of the first and third layers of the $SiO_2$ films were varied, as shown in FIG. 21. It is seen from the graph of FIG. 21 that the reflectance is not appreciably varied even in case the film thicknesses of the first and third $SiO_2$ films were varied by ±10 nm.

These results of the simulation indicate that, with the interface anti-reflection film group of the three layer structure, composed by a low refractive index film, a high refractive index film and another low refractive index film, stacked in this order, it is possible to reduce the reflectance provided that the refractive index nL of the low refractive index is less than 1.5, with the refractive index nH of the high refractive index being higher than 2.0. The results of the simulation also indicate that the reflectance equal to 0.3% or less may be obtained for the blue wavelength range (440 to 510 nm) provided that the refractive indices $n_{oblx}$, $n_{obly}$ ($n_{oblx} > n_{obly}$) of the two axes in the planer direction of the obliquely vapor deposited film, perpendicular to each other, are 1.55 or more and 1.7 or less, with the film thickness of the high refractive index film of the three layer structure ranging from 0.1 nm or more to 5.5 nm or less.

<4.2.1 Preparation of a Quarter Wave Plate>

Figure 22:
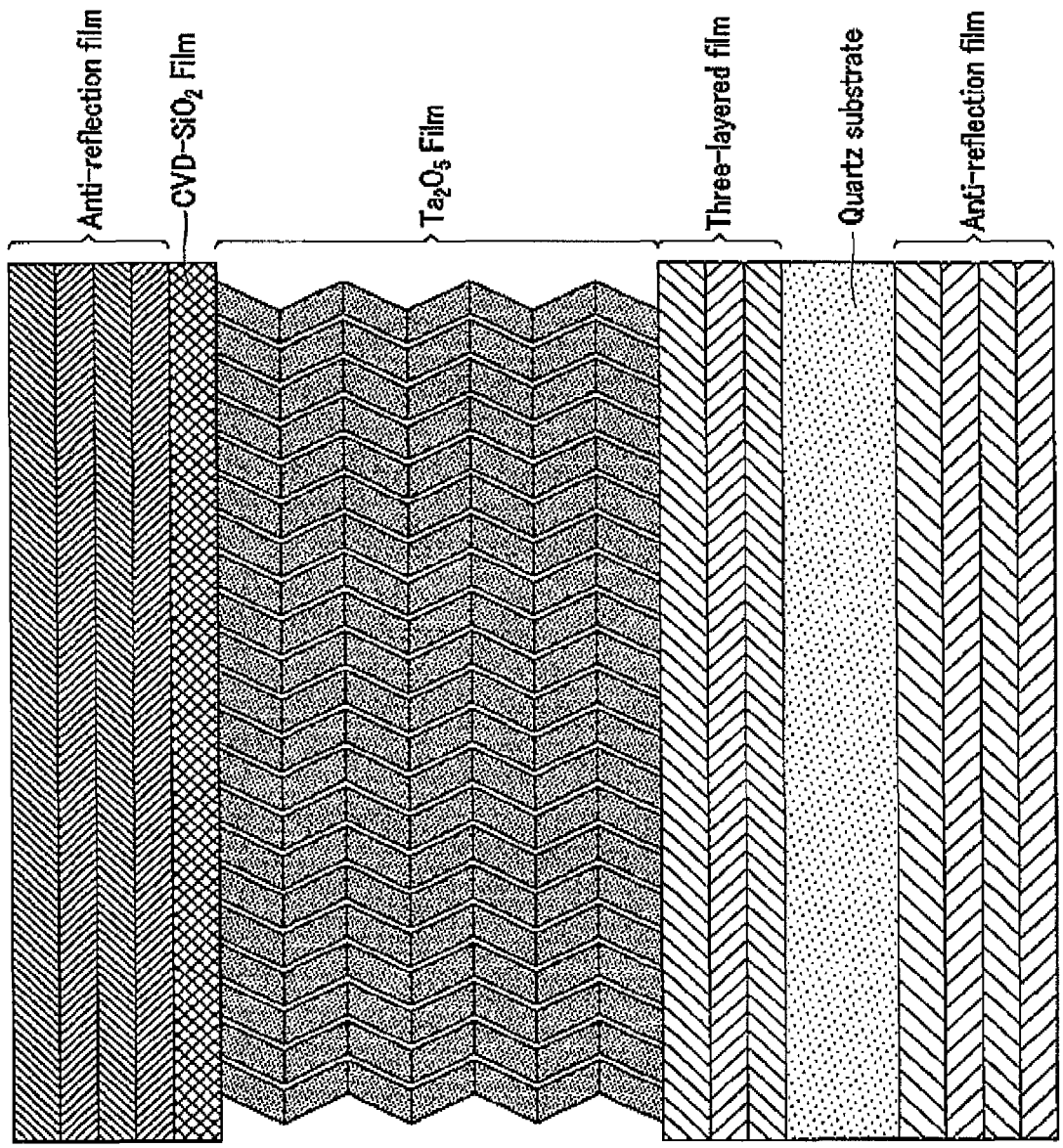
FIG. 22 is a schematic cross-sectional view showing the structure of a phase difference element of an Example.
Figure 23:
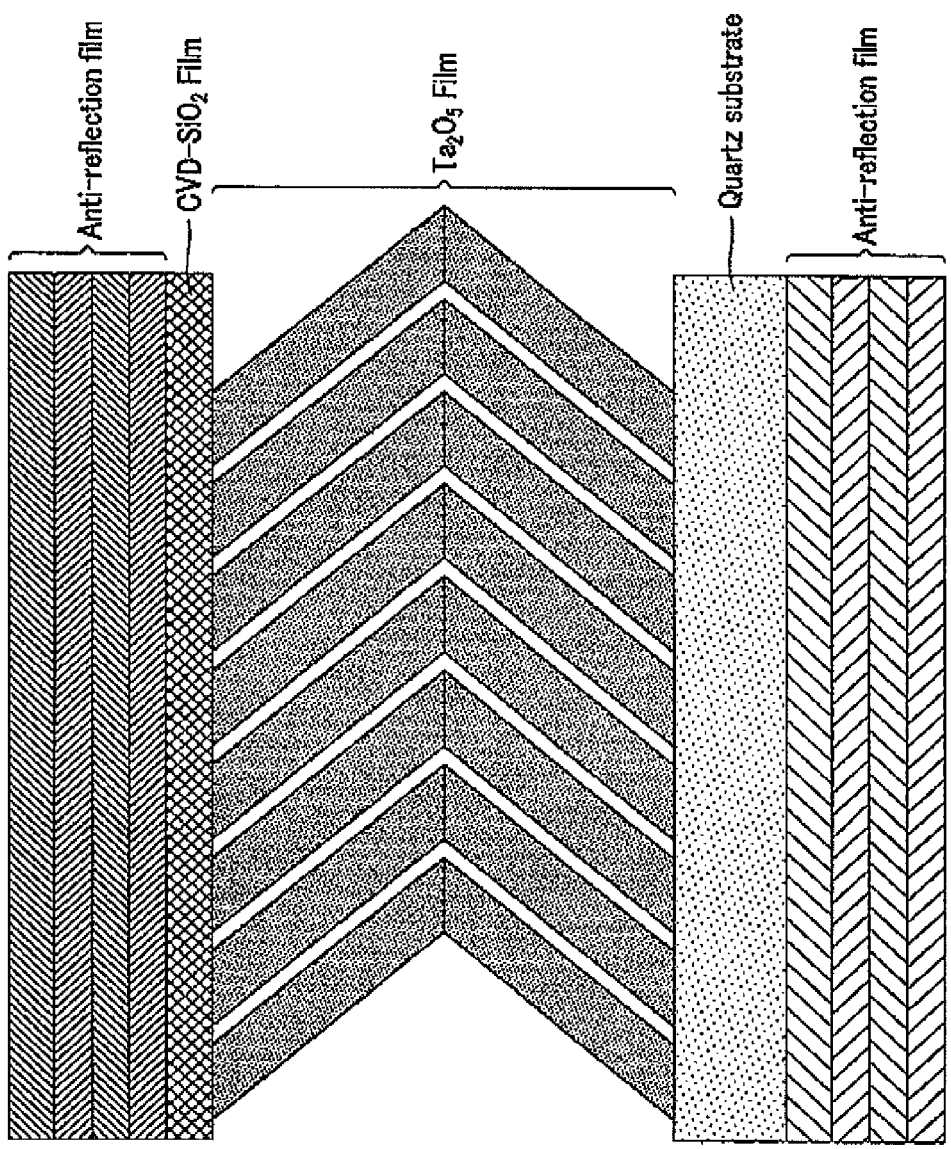
FIG. 23 is a schematic cross-sectional view showing the structure of a phase difference element of a Comparative Example.

In order to substantiate the above mentioned results of the simulation, a quarter wave plate was prepared. FIG. 22 schematically shows the structure of a phase difference element of the present Example. FIG. 23 schematically shows the structure of a phase difference element of a Comparative Example.

Example

A dielectric film group (interface anti-reflection film group) was deposited by sputtering on a quartz substrate. The dielectric film group has a refractive index intermediate between the refractive index of the quartz substrate and that of the obliquely vapor deposited film. This interface anti-reflection film group is of a multi-layered structure formed of two sorts of alternately deposited substances, that is, a relatively high refractive index substance and a relatively low refractive index substance. Specifically, the dielectric film group is of a structure composed by $SiO_2$ (93 mm), $Nb_2O_5$ (3 nm) and $SiO_2$ (35 nm), stacked on the quartz substrate (quartz substrate/$SiO_2$/$Nb_2O_5$/$SiO_2$). The uppermost layer of the interface anti-reflection film group is formed of $SiO_2$, the same substance as that of the substrate, in order to prevent variations otherwise caused in the optical properties of the obliquely vapor deposited film.

Then, a material for vapor deposition, mainly consisting of $Ta_2O_5$, was vapor deposited so that a source of vapor deposition is at 70° relative to the normal line to the quartz substrate. At this time, the quartz substrate was rotated through 180° in the planer direction, each time the material was deposited to a partial film thickness of 7 mm, so that the obliquely vapor deposited film composed by a plurality of layers with different film-forming directions could be prepared. The total film thickness of the layers of the obliquely vapor deposited film was set at 900 nm for operation of the phase difference element as the quarter wave plate in the blue wavelength range.

After the oblique vapor deposition, the processing of annealing at 200° C. was carried out for decoloring and for vaporizing the moisture adsorbed in the interstices of the columnar structure. After the annealing, a dielectric film ($SiO_2$ film) exhibiting high denseness was deposited by plasma TEOS-CVD to inhibit atmospheric air from intruding into or exiting from the obliquely vapor deposited film. An anti-reflection film, consisting of a dielectric material, was then formed by sputtering on both the front and reverse sides of the resulting film structure. In this manner, a phase difference element of the present Example, shown in FIG. 22, could be prepared.

Comparative Example

A phase difference element of the Comparative Example was prepared in the same way as in the above Example except not forming an interface anti-reflection film group and also except providing a two-layered obliquely vapor deposited film on a quartz substrate.

On a quartz substrate, a material for vapor deposition, consisting mainly of $Ta_2O_5$, was vapor deposited so that a source of vapor deposition was at 70° relative to the normal line to the substrate. At this time, the quartz substrate was rotated through 180° each time the material was deposited to a partial film thickness of 750 nm, so that the obliquely vapor deposited film composed by two layers with different film-forming directions was prepared. The film thickness of the two layers of the obliquely vapor deposited film was set at ca. 1500 nm for operation of the phase difference element as the quarter wave plate in the blue wavelength range. In this manner, the phase difference element of the Comparative Example shown in FIG. 23 could be prepared.

Optical Properties of Example and Comparative Example

Figure 24:
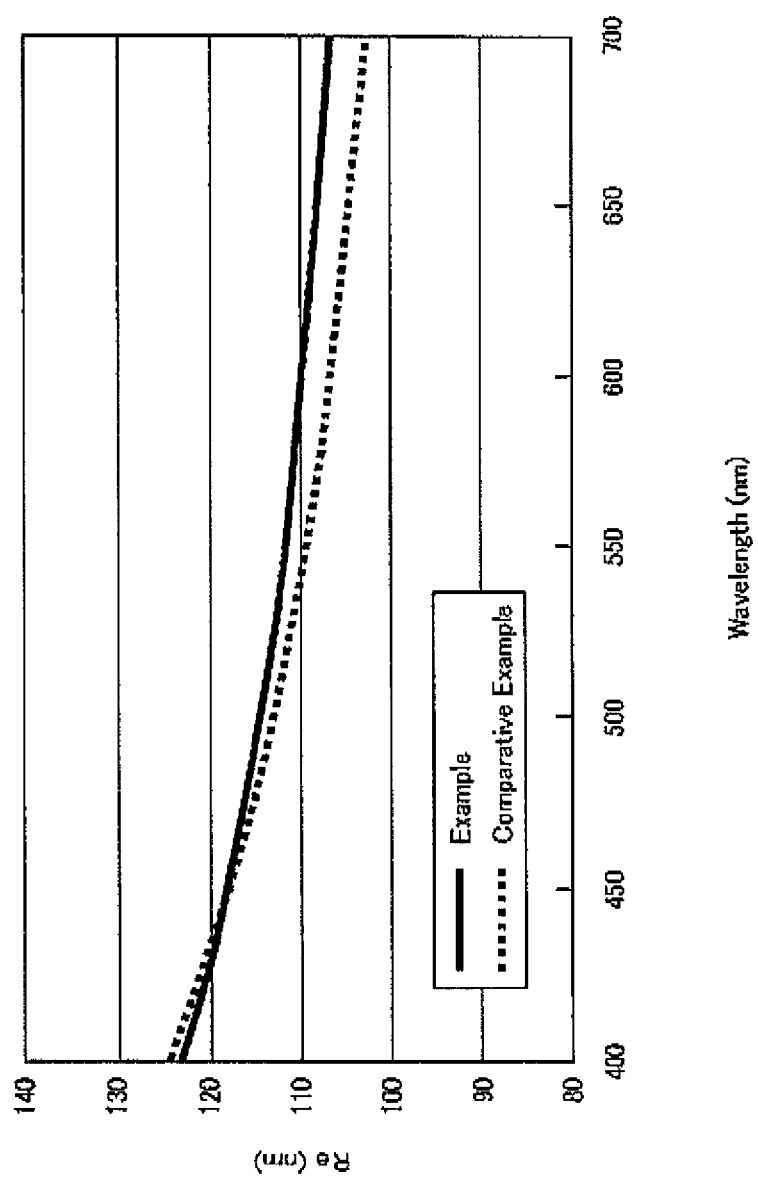
FIG. 24 is a graph showing wavelength dependency of retardation (Re).

FIG. 24 depicts a graph showing the wavelength dependency of retardation (Re). In the phase difference element of Example and Comparative Example, retardation of 460 nm was approximately 115 nm, indicating that both the Example and Comparative Example may operate as quarter wave plates.

Figure 25:
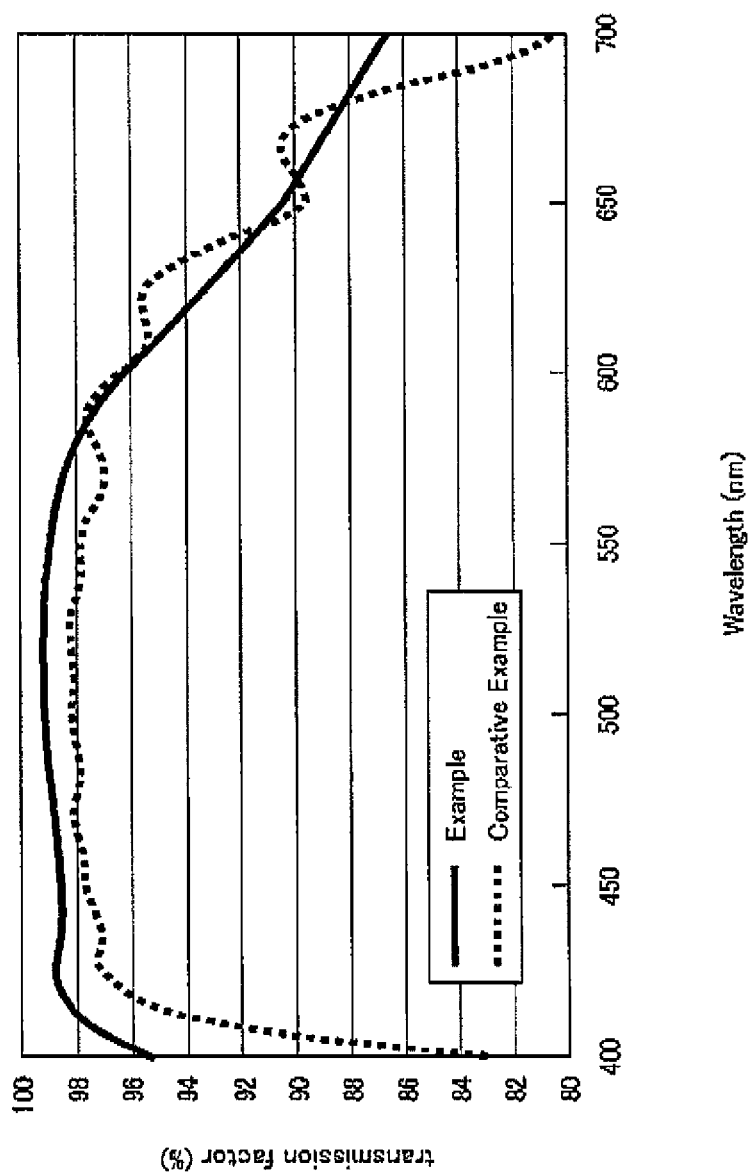
FIG. 25 is a graph showing wavelength dependency of the transmission factor.
Figure 26:
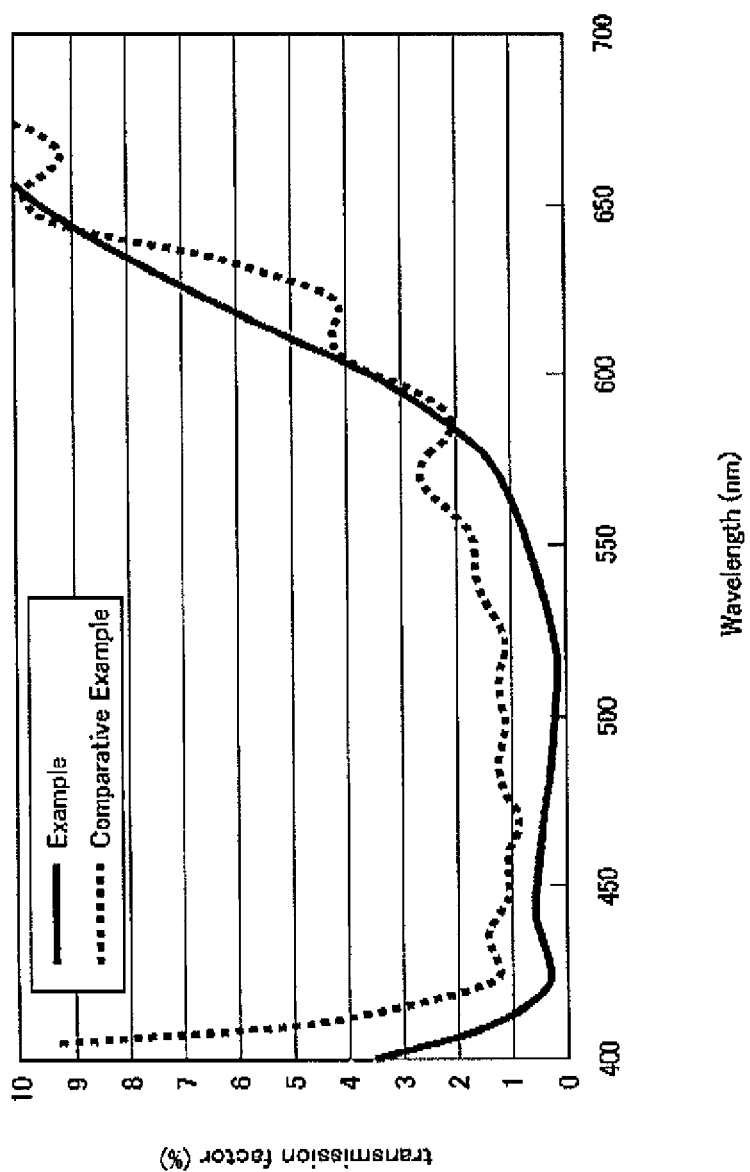
FIG. 26 is a graph showing wavelength dependency of the reflectance.

FIG. 25 depicts a graph showing the wavelength dependency of the transmission factor, and FIG. 26 depicts a graph showing the wavelength dependency of reflectance. It is seen that the transmission factor and the reflectance of the phase difference element of the Example are higher by ca. 1% and lower by ca. 0.5% than those of the Comparative Example, respectively. The lower reflectance of the Example is the result of using the multi-layer structures of the interface anti-reflection film and the obliquely vapor deposited film. That is, the transmission factor could be improved as a result of lowering the reflectance.

Simulation was then conducted to estimate the beneficent effect of the interface anti-reflection film group. The reflectance values in the blue wavelength range of the phase difference element of the Example having the interface anti-reflection film group of the three film structure composed by $SiO_2$ (93 nm)/$Nb_2O_5$ (3 nm)/$SiO_2$ (35 nm), and the phase difference element of the Comparative Example not having the interface anti-reflection film group of the three film structure, as above stated, were calculated.

Figure 27:
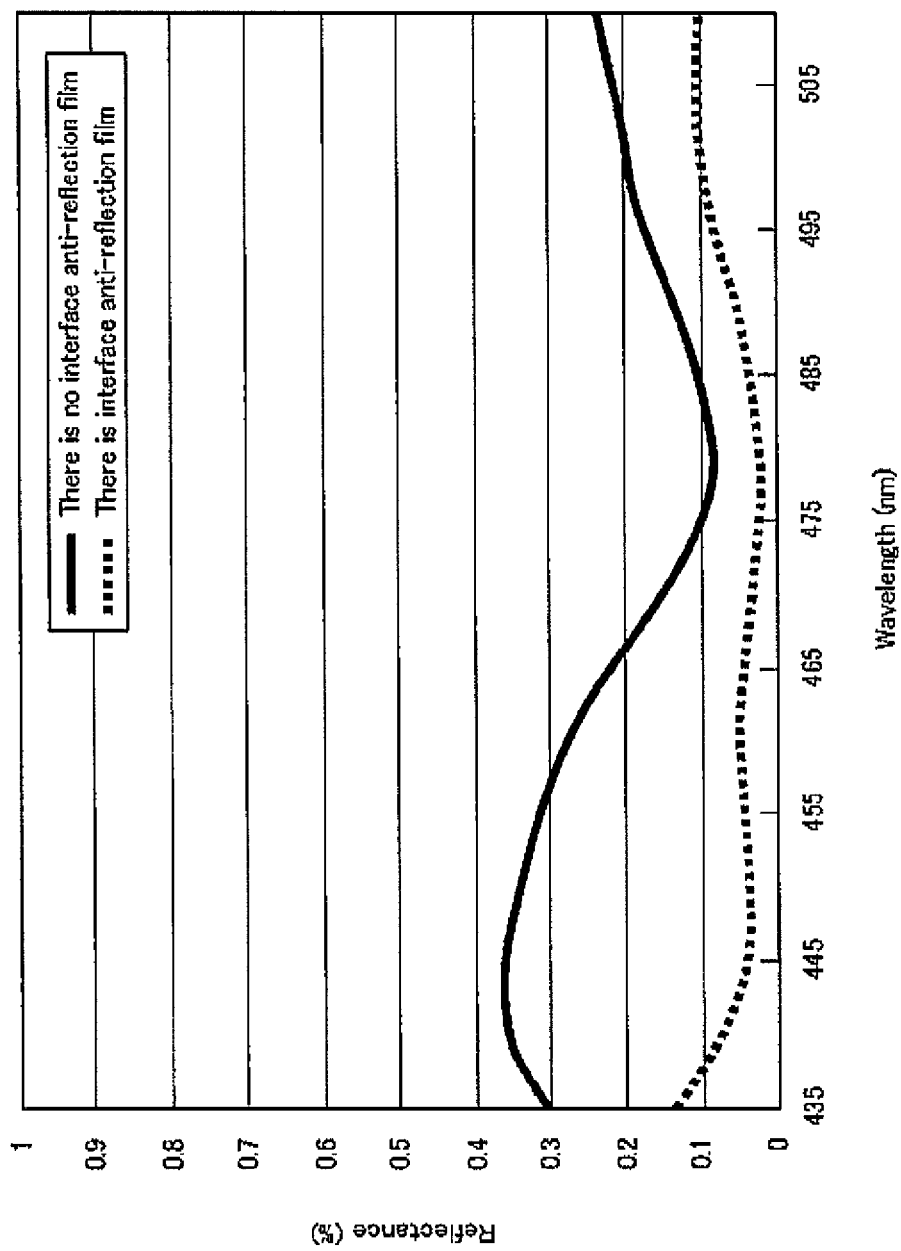
FIG. 27 is a graph showing the reflectance of phase difference elements of the Example and the Comparative Example.

FIG. 27 depicts a graph showing the reflectance values of both the Example and the Comparative Example. It is seen that, in the phase difference element of the Example having the interface anti-reflection film group, both the average value and the peak value of the reflectance are halved as compared to those in the phase difference element of the Comparative Example not having the interface anti-reflection film group.

Figure 28:
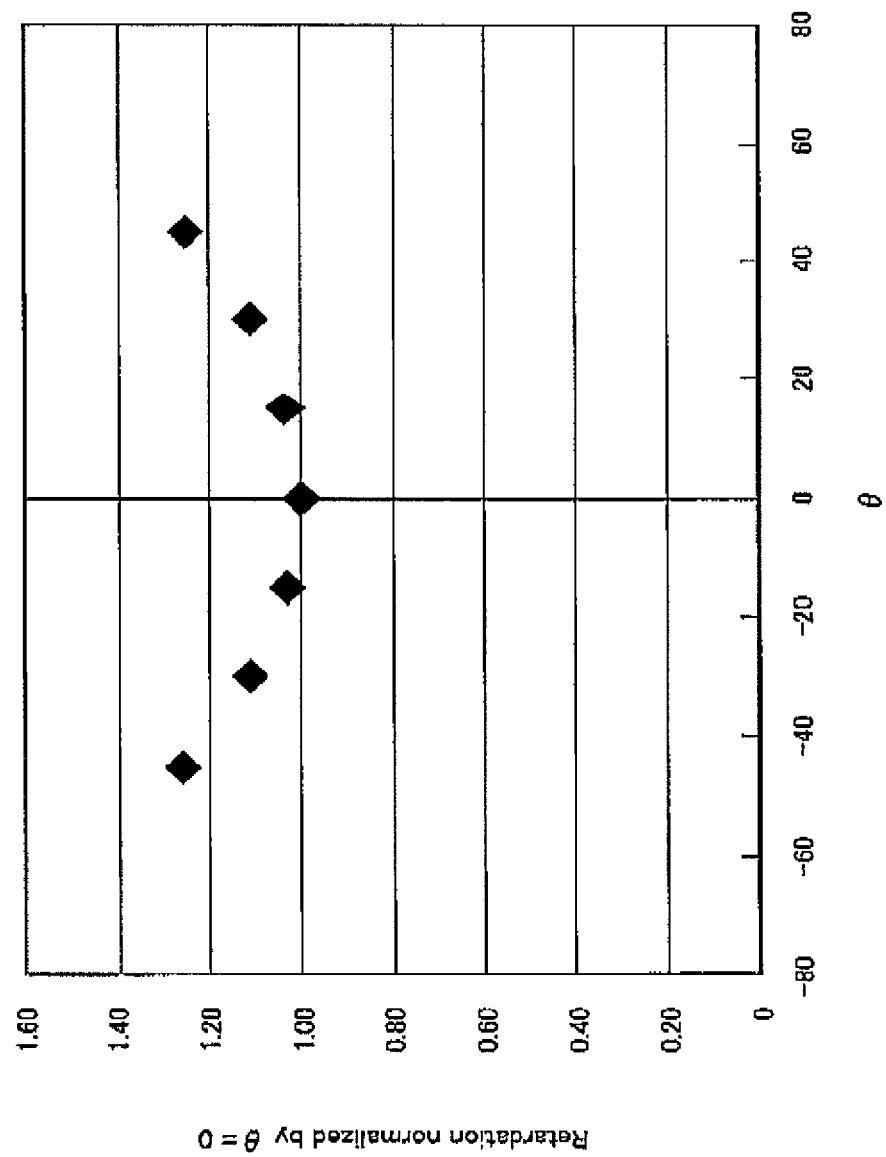
FIG. 28 is a graph showing incident angle dependency of retardation of the phase difference element of the Example.
Figure 29:
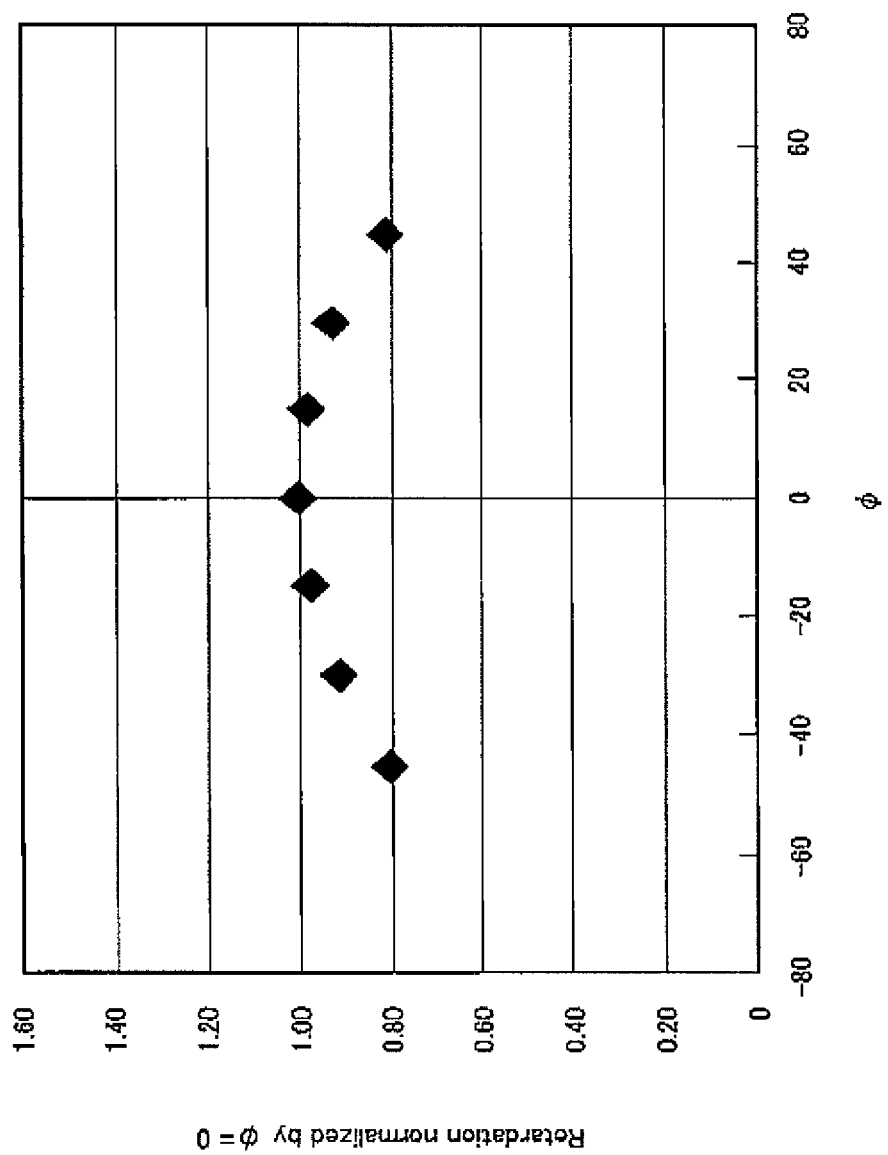
FIG. 29 is a graph showing incident angle dependency of retardation of the phase difference element of the Example.
Figure 30:
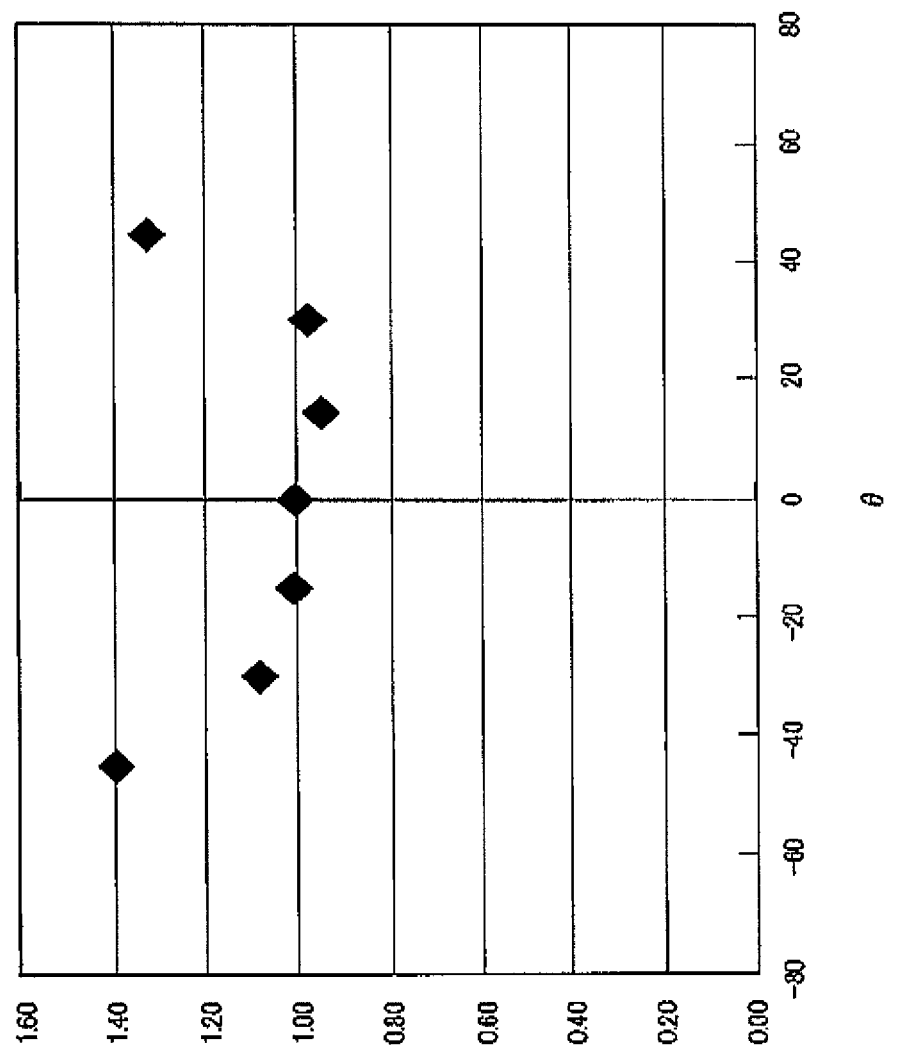
FIG. 30 is a graph showing incident angle dependency of retardation of a phase difference element of the Comparative Example.

It has also been seen that, in the present technique, not only the reflectance is decreased, but also the viewing angle dependency may be improved. FIGS. 28 and 29 depict graphs indicating incident angle dependency of retardation of the phase difference element of the Example, while FIG. 30 depicts a graph showing incident angle dependency of retardation of the phase difference element of the Comparative Example.

Figure 31:
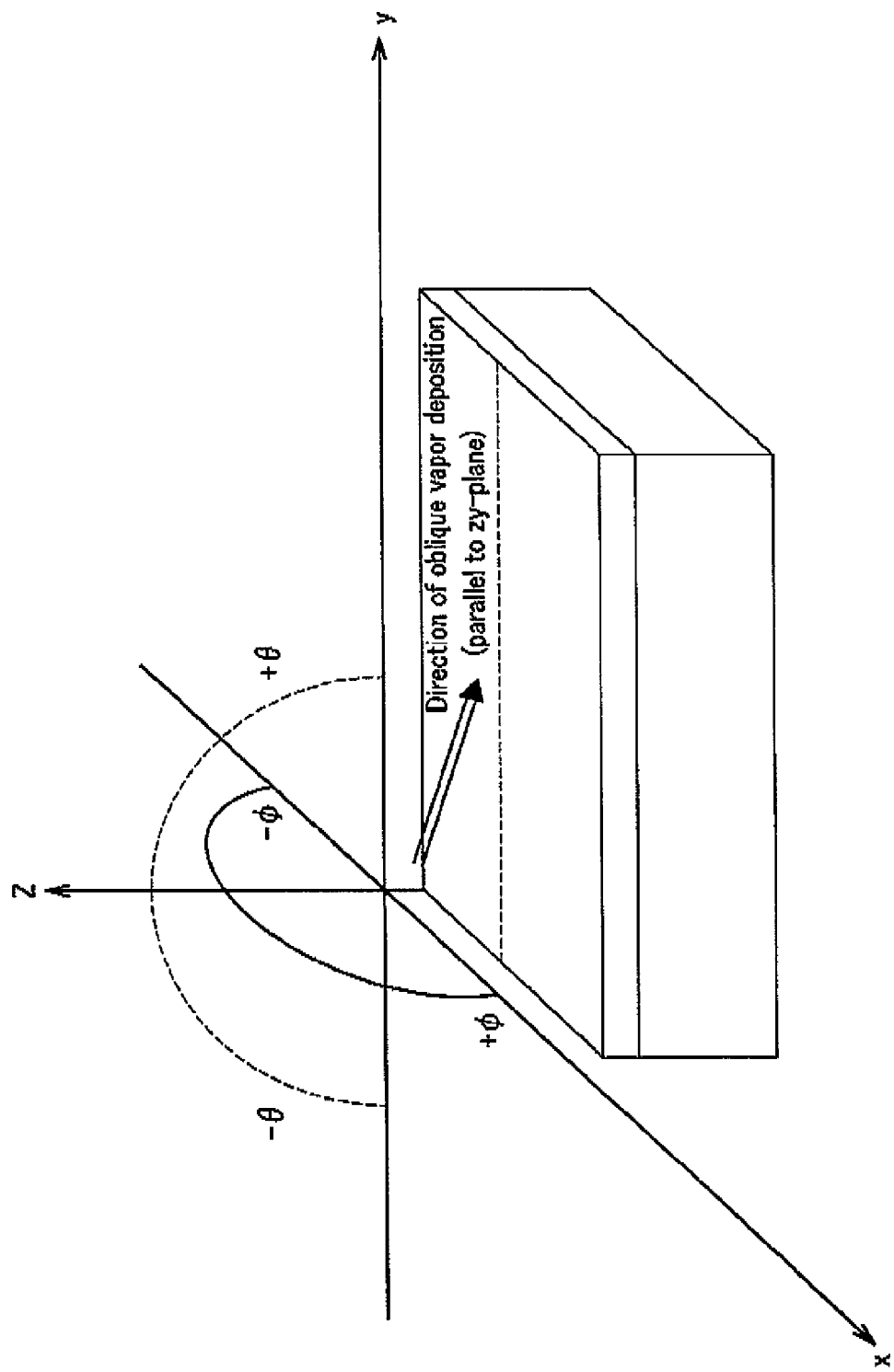
FIG. 31 is a schematic view for illustrating the incident angle to the phase difference element.

Referring to FIG. 31, it is assumed that the phase lead axis and the phase lag axis in the plane of the phase difference element are denoted as x and y axes, respectively. The phase lead axis is a direction parallel to the direction of oblique vapor deposition, while the phase lag axis is a direction normal to the direction of oblique vapor deposition. The direction of a line normal to the element is denoted as a z-axis. An angle of incident light along the z-axis direction is set at 0°. An angle of tilt of the incident light in the xz plane is indicated by $\theta$, while an angle of tilt of the incident light in the yz plane is indicated by $\Phi$. It is noted that the values of retardation shown in the graphs of FIGS. 28 to 30 are values normalized by the retardation value for the incident angle of 0°.

It has been seen that, in the phase difference element of the Example, the distribution of retardation exhibits left-right symmetry with respect to the optical axis. In the phase difference element of the Comparative Example, retardation in the $\theta$-direction roughly exhibits left-right symmetry, however, retardation in the $\Phi$-direction could not be measured accurately. The reason is that, in the Comparative Example, in which the obliquely vapor deposited film is formed to a film thickness not sufficiently thinner than the light wavelength, the axis of birefringence may appear to be those of two phase difference elements of respective different sorts overlaid together. Hence, no simple evaluation based on the 'refractive index differences' or on the 'axial direction', may be made, such that it is difficult to use the phase difference element of the Comparative Example for the incident light exhibiting angle dependency.

In the phase difference element of the present Example, the film thicknesses are sufficiently thinner than the light wavelength, so that the axes of birefringence of respective layers may be ignored. That is, the phase difference element of the present Example may be regarded as being a single multi-layered composite phase difference element the entire layers of which have a single axis of birefringence (z-axis direction in the present Example). Hence, the phase difference element may prove to be a proper element whose optical characteristic is free of incident angle dependency.

By introducing the interface anti-reflection film group, and by selecting the thickness of each layer of the obliquely vapor deposited multi-layered film to be thinner than the wavelength range of light in use, it is possible to reduce reflectance and to improve the incident angle dependency to left-right symmetry.

The phase difference elements of the Example and the Comparative Example were used as quarter wave plates for blue light wavelengths in a reflection liquid crystal projector. It was found that, with the phase difference element of the present Example, the brightness and contrast were better by 1% and 5%, respectively, than in case the phase difference element of the Comparative Example was used. In case the present technique is applied as a quarter wave plate for green and red light wavelength ranges, further improvements may naturally be expected in brightness and contrast.

The present invention is not to be limited to the above Example such that a wide variety of changes or adjustments may be made without departing from the scope of the invention. For example, in the above described phase difference element of the present Example, the axis of birefringence is the z-axis because of the equal film thicknesses of the respective films or layers. The axial direction may be tilted at a desired angle by changing the film thicknesses of the respective films or layers.

The above Example is directed to a quarter wave plate for the blue light wavelength range. The technique disclosed may, however, be applied to a quarter wave plate for the green and red light wavelength ranges, half wave plates for respective channels, quarter and half wave plates for wider ranges or to phase difference compensation elements.

It should be understood by those skilled in the art that various modifications, combinations and alterations may occur depending on design requirements and other factors insofar as they are within the scope of the appended claims or the equivalents thereof.

What is claimed is:

1. A phase difference element comprising:
  a transparent substrate;
  an obliquely vapor deposited multi-layer film formed by a plurality of layers of a dielectric material, the layers of the dielectric material being alternately vapor deposited from two directions differing by 180° from each other, with the thicknesses of the respective layers being not greater than the wavelength of light in use; and
  an interface anti-reflection film group composed by one or more of alternately high and low refractive index films stacked between the transparent substrate and the obliquely vapor deposited multi-layer film, the refractive index of the interface anti-reflection film group being higher than the refractive index of the transparent substrate and lower than the refractive index of the obliquely vapor deposited film.

2. The phase difference element of claim 1, wherein the average refractive index n of the interface anti-reflection film group is represented by the following formula (1):

$$0 < n_{sub} < n < (n_{oblx} + n_{obly})/2 \quad (1)$$

where $n_{sub}$ denotes a refractive index of the transparent substrate, and $n_{oblx}$, $n_{obly}$, where $n_{oblx} > n_{obly}$, denote refractive indices of two planer axes x, y of the obliquely vapor deposited film, perpendicular to each other, respectively.

3. The phase difference element of claim 1, wherein the film of the interface anti-reflection film group in contact with the obliquely vapor deposited film is formed of $SiO_2$.

4. The phase difference element of claim 1, wherein the interface anti-reflection film group is of a three layer structure composed by a low refractive index film, a high refractive index film and a low refractive index film, stacked in this order, with the refractive index of the low refractive index film being less than 1.5 and with the refractive index of the high refractive index film being greater than 2.0.

5. The phase difference element of claim 4, wherein the refractive indices $n_{oblx}$, $n_{obly}$, where $n_{oblx} > n_{obly}$, of the two planer axes of the obliquely vapor deposited film, perpendicular to each other, both range from 1.55 or more to 1.7 or less, the film thickness of the high refractive index film of the three layer structure ranging from 0.1 or more to 5.5 nm or less.

6. The phase difference element of claim 4, wherein the film thickness of the interface anti-reflection film group is 90% of the design center wavelength or less.

7. The phase difference element of claim 3, wherein the film thickness of $SiO_2$ in contact with the obliquely vapor deposited film is 60 nm or more.

8. The phase difference element of claim 1, wherein a CVD (Chemical Vapor Deposition) film formed of a dielectric material is formed on the obliquely vapor deposited film.

9. The phase difference element of claim 1, wherein an anti-reflection film is formed on each of the front and reverse surfaces thereof.

10. The phase difference element of claim 1, wherein the dielectric material of the obliquely vapor deposited film is an oxide of any of Ta, Zr, Ti, Si, Al, Nb and La either alone or in combination.

11. A method for manufacturing a phase difference element comprising:
  alternately depositing one or more of high and low refractive index films on a transparent substrate to form an interface anti-reflection film group the refractive index of which is higher than the refractive index of the transparent substrate and lower than that of the obliquely vapor deposited film; and
  alternately obliquely depositing a dielectric material on the interface anti-reflection film group from two directions differing 180° from each other to form a multi-layered obliquely vapor deposited film, with each component layer of the multi-layered obliquely vapor deposited film being of a thickness not greater than the wavelength of light in use.

12. A liquid crystal projector comprising:
  a phase difference element arranged between a polarization beam splitter and a liquid crystal cell, the phase difference element comprising:
    a transparent substrate;
    an obliquely vapor deposited multi-layer film formed by a plurality of layers of a dielectric material, the layers of the dielectric material being alternately vapor deposited from two directions differing by 180° from each other, with the thicknesses of the respective layers being not greater than the wavelength of light in use; and
    an interface anti-reflection film group composed by one or more of alternately high and low refractive index films stacked between the transparent substrate and the obliquely vapor deposited multi-layer film, the refractive index of the interface anti-reflection film group being higher than the refractive index of the transparent substrate and lower than the refractive index of the obliquely vapor deposited film.

13. An optical implement carrying thereon a phase difference element comprising:
  a transparent substrate;
  an obliquely vapor deposited multi-layer film formed by a plurality of layers of a dielectric material, the layers of the dielectric material being alternately vapor deposited from two directions differing by 180° from each other, with the thicknesses of the respective layers being not greater than the wavelength of light in use; and
  an interface anti-reflection film group composed by one or more of alternately high and low refractive index films stacked between the transparent substrate and the obliquely vapor deposited multi-layer film, the refractive index of the interface anti-reflection film group being higher than the refractive index of the transparent substrate and lower than the refractive index of the obliquely vapor deposited film.

* * * * *